United States Patent
Yi et al.

(10) Patent No.: US 11,303,420 B2
(45) Date of Patent: Apr. 12, 2022

(54) METHOD AND DEVICE FOR PERFORMING INITIAL CONNECTION IN WIRELESS COMMUNICATION SYSTEM

(71) Applicant: LG ELECTRONICS INC., Seoul (KR)

(72) Inventors: Yunjung Yi, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 82 days.

(21) Appl. No.: 16/755,543

(22) PCT Filed: Oct. 15, 2018

(86) PCT No.: PCT/KR2018/012104
§ 371 (c)(1),
(2) Date: Apr. 10, 2020

(87) PCT Pub. No.: WO2019/074338
PCT Pub. Date: Apr. 18, 2019

(65) Prior Publication Data
US 2020/0266959 A1    Aug. 20, 2020

Related U.S. Application Data

(60) Provisional application No. 62/630,243, filed on Feb. 14, 2018, provisional application No. 62/572,534, filed on Oct. 15, 2017.

(51) Int. Cl.
*H04L 5/00* (2006.01)
*H04L 1/16* (2006.01)
*H04W 74/08* (2009.01)

(52) U.S. Cl.
CPC .......... *H04L 5/0092* (2013.01); *H04L 1/1642* (2013.01); *H04L 5/0094* (2013.01); *H04W 74/0833* (2013.01)

(58) Field of Classification Search
CPC ... H04L 5/0091; H04L 5/0092; H04L 5/0094; H04L 1/16; H04L 1/1607; H04L 1/1642;
(Continued)

(56) References Cited

U.S. PATENT DOCUMENTS 10,701,734 B2 * 6/2020 Shih ...................... H04W 72/02
10,999,870 B2 * 5/2021 Ou ........................ H04W 74/008
(Continued)

FOREIGN PATENT DOCUMENTS

KR    20120043005    5/2012

OTHER PUBLICATIONS

PCT International Application No. PCT/KR2018/012104, International Search Report dated Jan. 16, 2019, 2 pages.
(Continued)

*Primary Examiner* — Warner Wong
(74) *Attorney, Agent, or Firm* — Lee Hong Degerman Kang & Waimey

(57) ABSTRACT

In a wireless communication system, user equipment (UE) receives information about an uplink (UL) bandwidth part (BWP) from a network through remaining minimum system information (RMSI), and transmits an MSG3 of a random access procedure to the network through the UL BWP. The UL BWP can be configured separately from a downlink (DL) BWP.

6 Claims, 20 Drawing Sheets

(58) Field of Classification Search
CPC ....... H04L 5/003–0035; H04L 12/5612; H04L 12/40065; H04L 2012/5631; H04L 47/70; H04L 47/78; H04L 47/781; H04L 29/06326; H04L 65/169; H04L 41/0806; H04L 2025/03656; H04L 5/0096; H04L 5/0098; H04L 29/06993; H04L 1/1848; H04L 1/1861; H04L 1/188; H04L 1/1893; H04L 41/0896; H04L 47/76; H04W 74/08; H04W 74/0833; H04W 72/00; H04W 72/04; H04W 72/0406; H04W 72/0413; H04W 72/042; H04W 76/10; H04W 72/1278; H04W 72/1284; H04W 72/1263; H04W 72/1273; H04W 76/38; H04W 28/00

See application file for complete search history.

(56) References Cited

U.S. PATENT DOCUMENTS

| | | | |
|---|---|---|---|
| 2016/0295609 A1* | 10/2016 | Vajapeyam | H04L 5/14 |
| 2017/0045426 A1* | 2/2017 | Ueno | G01N 1/286 |
| 2017/0273113 A1* | 9/2017 | Tirronen | H04W 72/042 |
| 2017/0290016 A1* | 10/2017 | Yi | H04L 5/0053 |
| 2018/0077696 A1* | 3/2018 | Lee | H04W 72/048 |
| 2018/0124836 A1* | 5/2018 | Hong | H04W 74/008 |
| 2018/0183551 A1* | 6/2018 | Chou | H04L 5/0098 |
| 2018/0337755 A1 | 11/2018 | Wilson et al. | |
| 2019/0098667 A1* | 3/2019 | Lai | H04W 74/0833 |
| 2019/0124646 A1* | 4/2019 | Ly | H04W 74/006 |
| 2019/0306887 A1* | 10/2019 | Rathonyi | H04L 5/0012 |
| 2019/0313437 A1* | 10/2019 | Jung | H04L 5/0042 |
| 2019/0349983 A1* | 11/2019 | Loehr | H04W 52/365 |
| 2019/0350006 A1* | 11/2019 | Qian | H04W 74/0833 |
| 2020/0053811 A1* | 2/2020 | Ang | H04W 28/20 |
| 2020/0059390 A1* | 2/2020 | Zhang | H04L 1/0004 |
| 2020/0084698 A1* | 3/2020 | Rune | H04W 48/08 |
| 2020/0178315 A1* | 6/2020 | Li | H04W 16/14 |
| 2020/0213066 A1* | 7/2020 | Ma | H04W 72/04 |
| 2020/0236574 A1* | 7/2020 | Ohuchi | H04B 7/0626 |
| 2020/0252578 A1* | 8/2020 | Stamcar | H04N 5/913 |
| 2020/0296656 A1 | 9/2020 | Amuru et al. | |
| 2020/0366418 A1* | 11/2020 | Zhuo | H04L 1/1812 |
| 2020/0382264 A1* | 12/2020 | Aiba | H04L 5/0044 |
| 2021/0007085 A1* | 1/2021 | Lin | H04W 72/042 |
| 2021/0058947 A1* | 2/2021 | Lin | H04W 72/04 |

OTHER PUBLICATIONS

LG Electronics, "RMSI delivery and CORESET configuration," 3GPP TSG RAN WG1 Meeting NR#3, R1-1715842, Nagoya, Japan, Sep. 18-21, 2017, 9 pages.

MediaTek Inc., "Summary of Bandwidth Part Operation" 3GPP TSG RAN WG1 Meeting 90bis, R1-1718901, Prague, CZ, Oct. 9-13, 2017, 16 pages.

"3GPP; TSG RAN; NR; Physical layer procedures for control (Release 15);" 3GPP TS 38.213 V1.0.0, (Sep. 2017), 18 pages.

Nokia et al., "On remaining aspects of BWPs," 3GPP TSG-RAN WG1 Meeting #90bis, R1-1718607, Prague, CZ, Oct. 9-13, 2017, 7 pages.

United States Patent and Trademark Office U.S. Appl. No. 16/755,550, Office Action dated Feb. 18, 2022, 20 pages.

* cited by examiner (a)        (b)

METHOD AND DEVICE FOR PERFORMING INITIAL CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2018/012104, filed on Oct. 15, 2018, which claims the benefit of U.S. Provisional Application No. 62/572,534, filed on Oct. 15, 2017, and 62/630,243, filed on Feb. 14, 2018, the contents of which are all hereby incorporated by reference herein in their entirety.

TECHNICAL FIELD

The present disclosure relates to wireless communication, and more specifically, to a method and apparatus for performing initial access in a wireless communication system, in particular, a new radio (NR) access technology.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

The initial access of the NR is for initial synchronization of downlink and system information acquisition and radio resource control (RRC) connection through a random access procedure, which is basically the same as the purpose of the initial access technology of the 3GPP LTE/LTE-A. In addition, the NR includes various element technologies for supporting multi-beam transmission and wideband from the initial access stage.

SUMMARY

Due to the inherent characteristics of the NR, the initial access procedure of the NR may be different from the initial access procedure of the existing 3GPP LTE/LTE-A. The present disclosure discusses the initial access procedure in the NR.

In an aspect, a method for operating a user equipment (UE) in a wireless communication system. The method includes receiving information on an uplink (UL) bandwidth part (BWP) from a network through remaining minimum system information (RMSI), and transmitting a MSG3 of a random access procedure to the network through the UL BWP.

In another aspect, a user equipment (UE) in a wireless communication system is provided. The UE includes a memory, a transceiver, and a processor connected to the memory and the transceiver. The processor is configured to control the transceiver to receive information on an uplink (UL) bandwidth part (BWP) from a network through remaining minimum system information (RMSI), and control the transceiver to transmit a MSG3 of a random access procedure to the network through the UL BWP.

In another aspect, a method for operating a base station in a wireless communication system is provided. The method includes transmitting information on an uplink (UL) bandwidth part (BWP) to a user equipment (UE) through remaining minimum system information (RMSI), and receiving a MSG3 of a random access procedure from the UE through the UL BWP.

An initial access procedure can be performed efficiently in NR.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
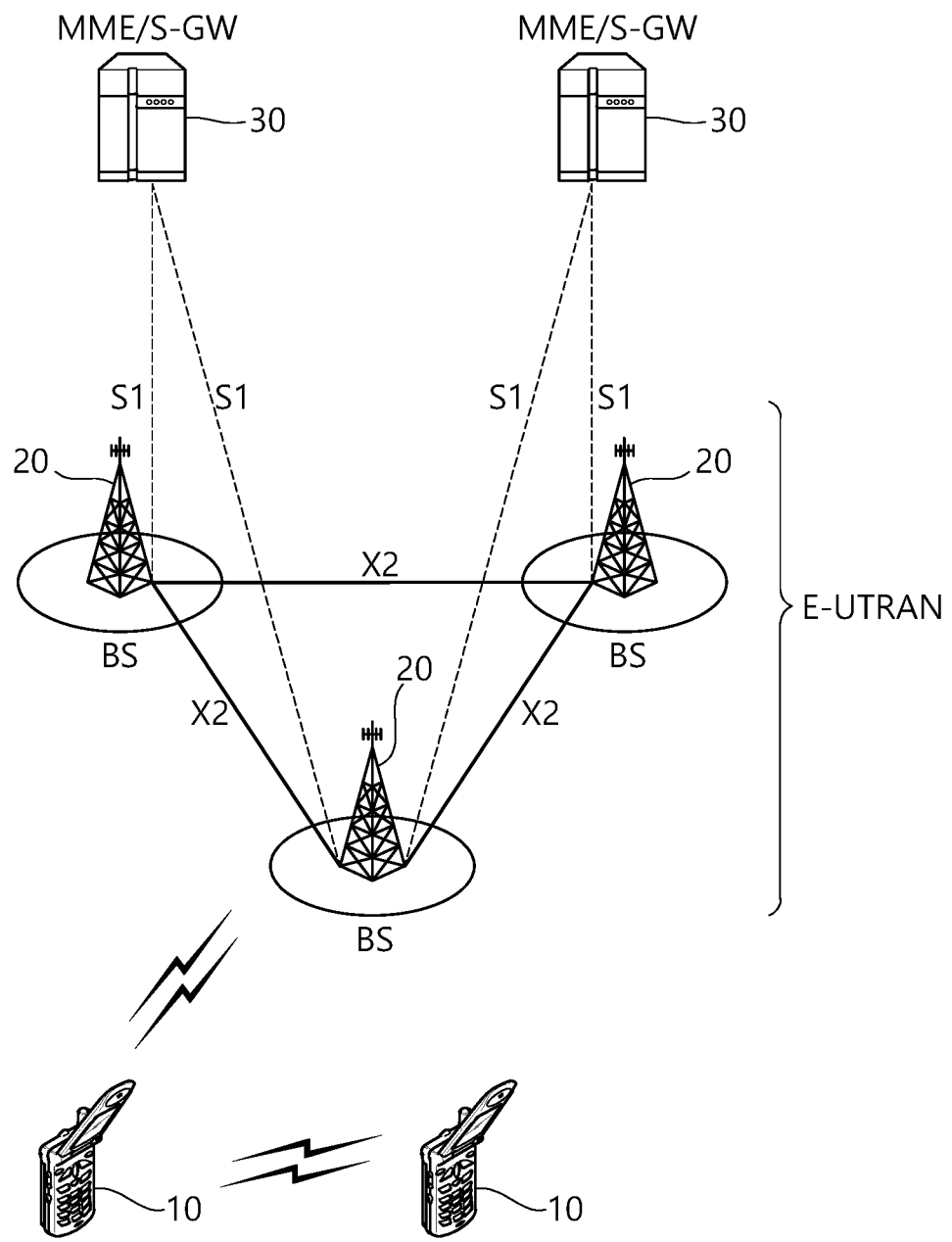
FIG. 1 shows an example of a wireless communication system to which technical features of the present disclosure can be applied.

FIG. 1 shows an example of a wireless communication system to which technical features of the present disclosure can be applied. Specifically, FIG. 1 shows a system architecture based on an evolved-UMTS terrestrial radio access network (E-UTRAN). The aforementioned LTE is a part of an evolved-UMTS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
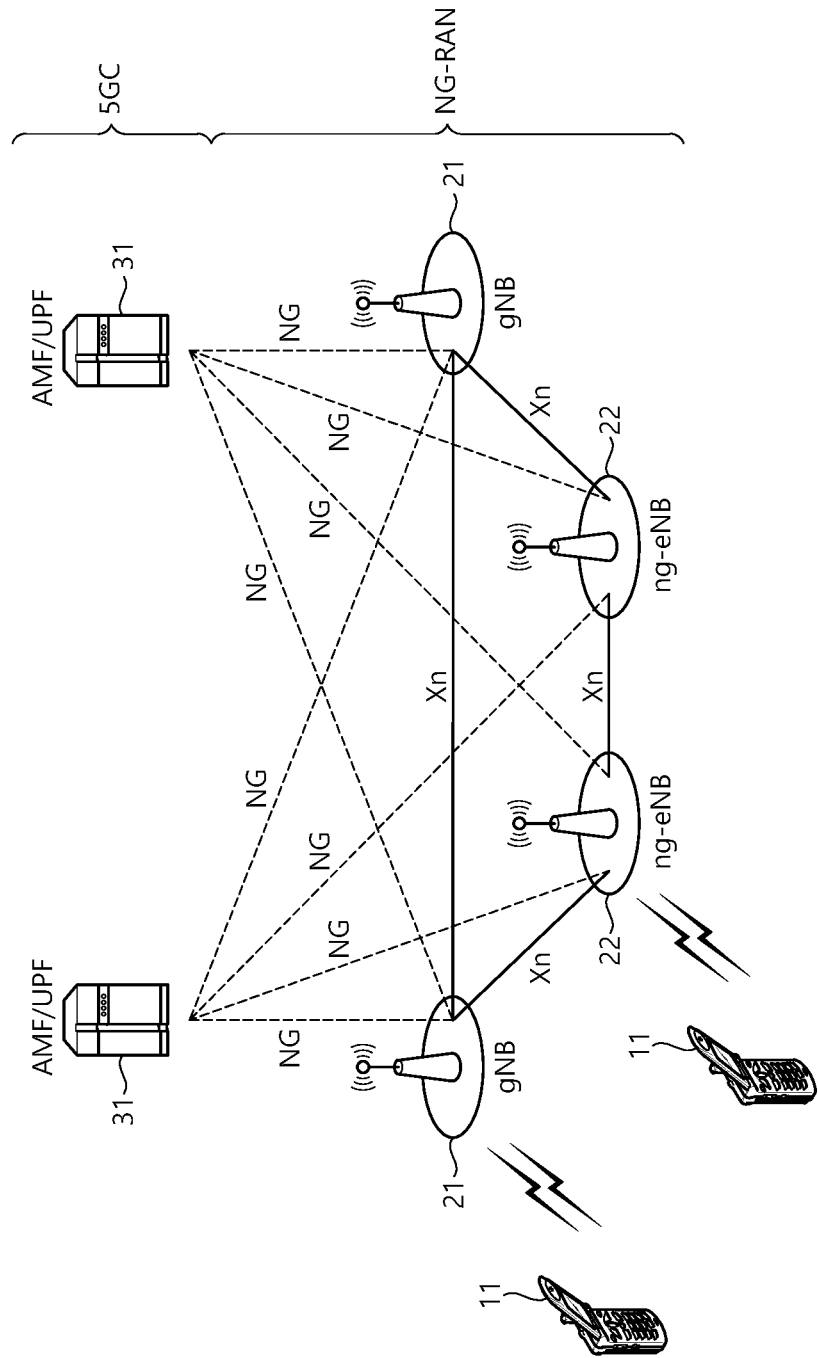
FIG. 2 shows another example of a wireless communication system to which technical features of the present disclosure can be applied.

FIG. 2 shows another example of a wireless communication system to which technical features of the present disclosure can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index μ.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
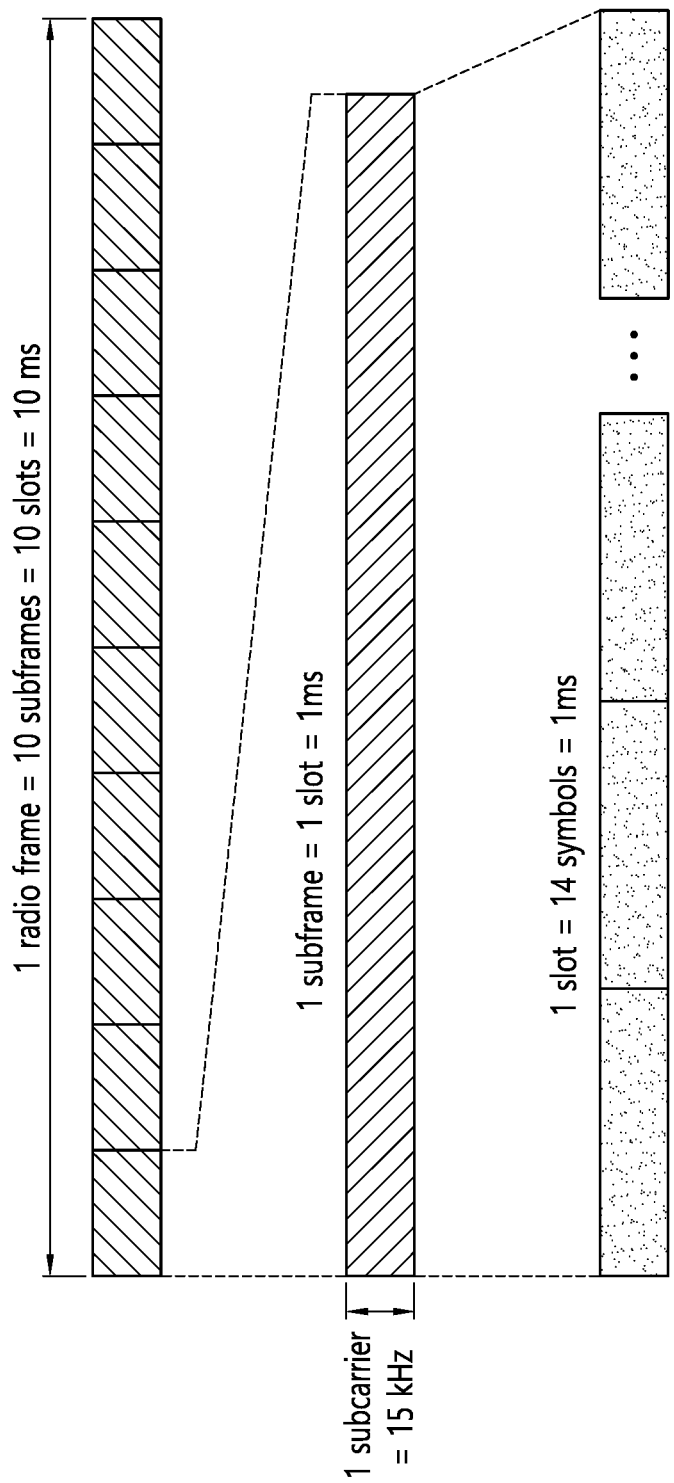
FIG. 3 shows an example of a frame structure to which technical features of the present disclosure can be applied.

FIG. 3 shows an example of a frame structure to which technical features of the present disclosure can be applied. In FIG. 3, a subcarrier spacing is 15 kHz, which corresponds to μ=0.

Figure 4:
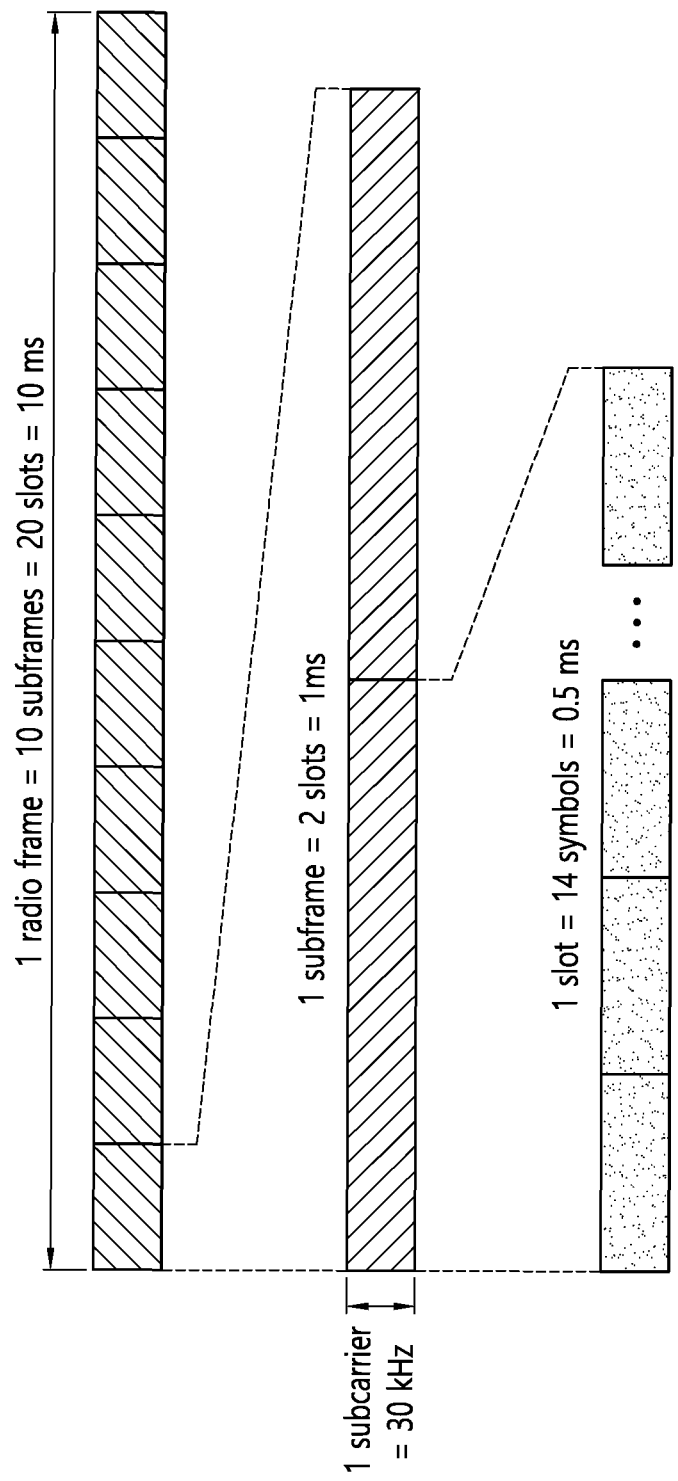
FIG. 4 shows another example of a frame structure to which technical features of the present disclosure can be applied.

FIG. 4 shows another example of a frame structure to which technical features of the present disclosure can be applied. In FIG. 4, a subcarrier spacing is 30 kHz, which corresponds to μ=1.

Meanwhile, a frequency division duplex (FDD) and/or a time division duplex (TDD) may be applied to a wireless system to which an embodiment of the present disclosure is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 3 shows an example of a slot format which is identified by a corresponding format index. The contents of the Table 3 may be commonly applied to a specific cell, or may be commonly applied to adjacent cells, or may be applied individually or differently to each UE.

TABLE 3

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| . . . | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
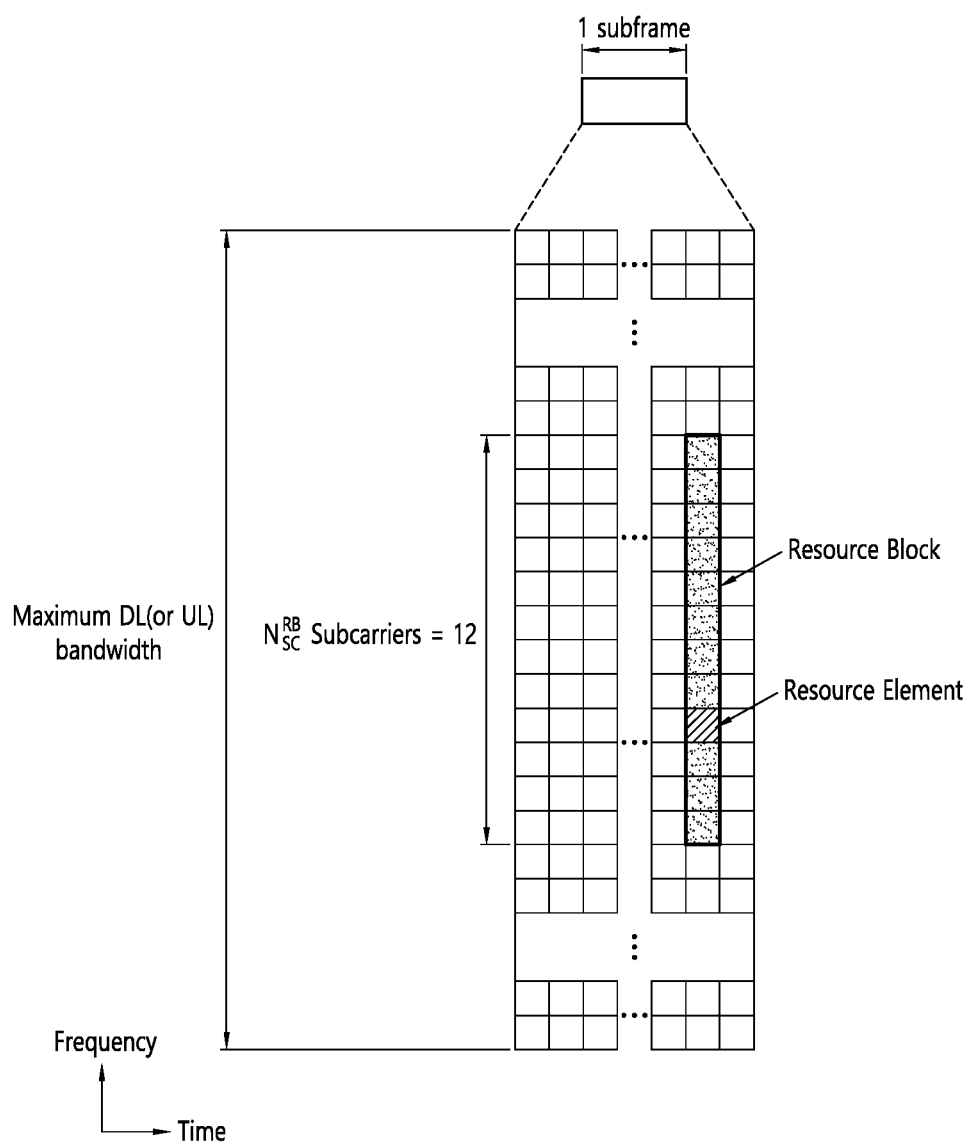
FIG. 5 shows an example of a resource grid to which technical features of the present disclosure can be applied.

FIG. 5 shows an example of a resource grid to which technical features of the present disclosure can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
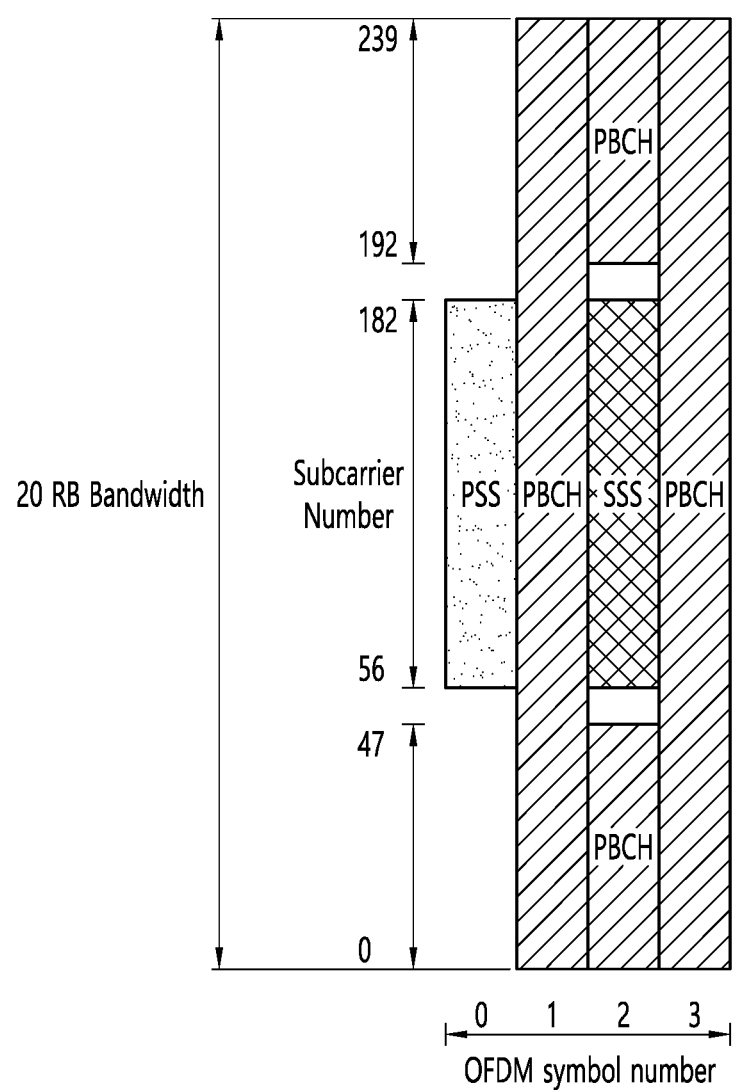
FIG. 6 shows an example of a synchronization channel to which technical features of the present disclosure can be applied.

FIG. 6 shows an example of a synchronization channel to which technical features of the present disclosure can be applied. Referring to FIG. 6, the PSS and SSS may include one symbol and 127 subcarriers. The PBCH may include 3 symbols and 240 subcarriers.

The PSS is used for synchronization signal/PBCH block (SS/PBCH block) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g. random access operations). The SS/PBCH block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SS/PBCH block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
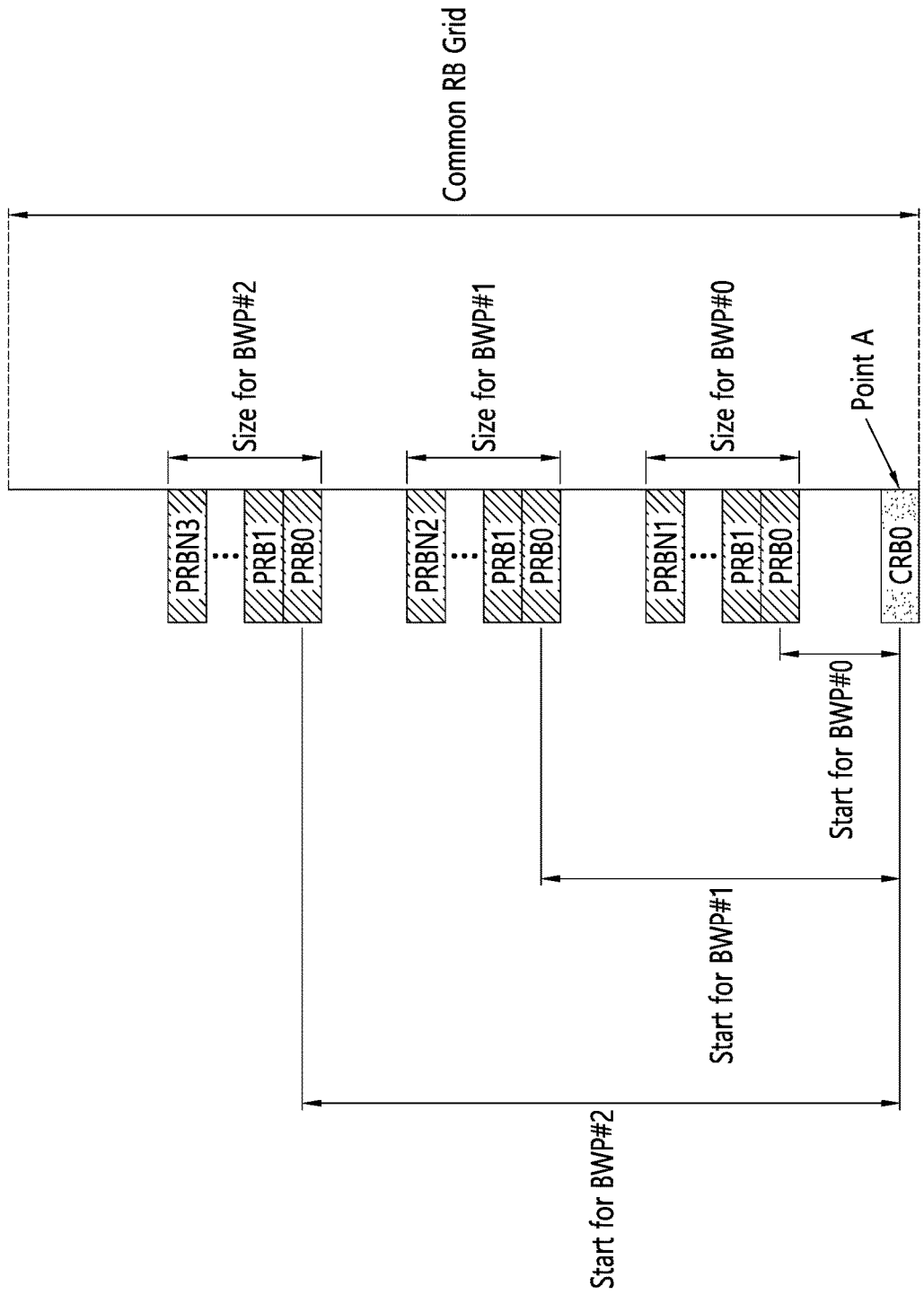
FIG. 7 shows an example of a frequency allocation scheme to which technical features of the present disclosure can be applied.

FIG. 7 shows an example of a frequency allocation scheme to which technical features of the present disclosure can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SS/PBCH block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
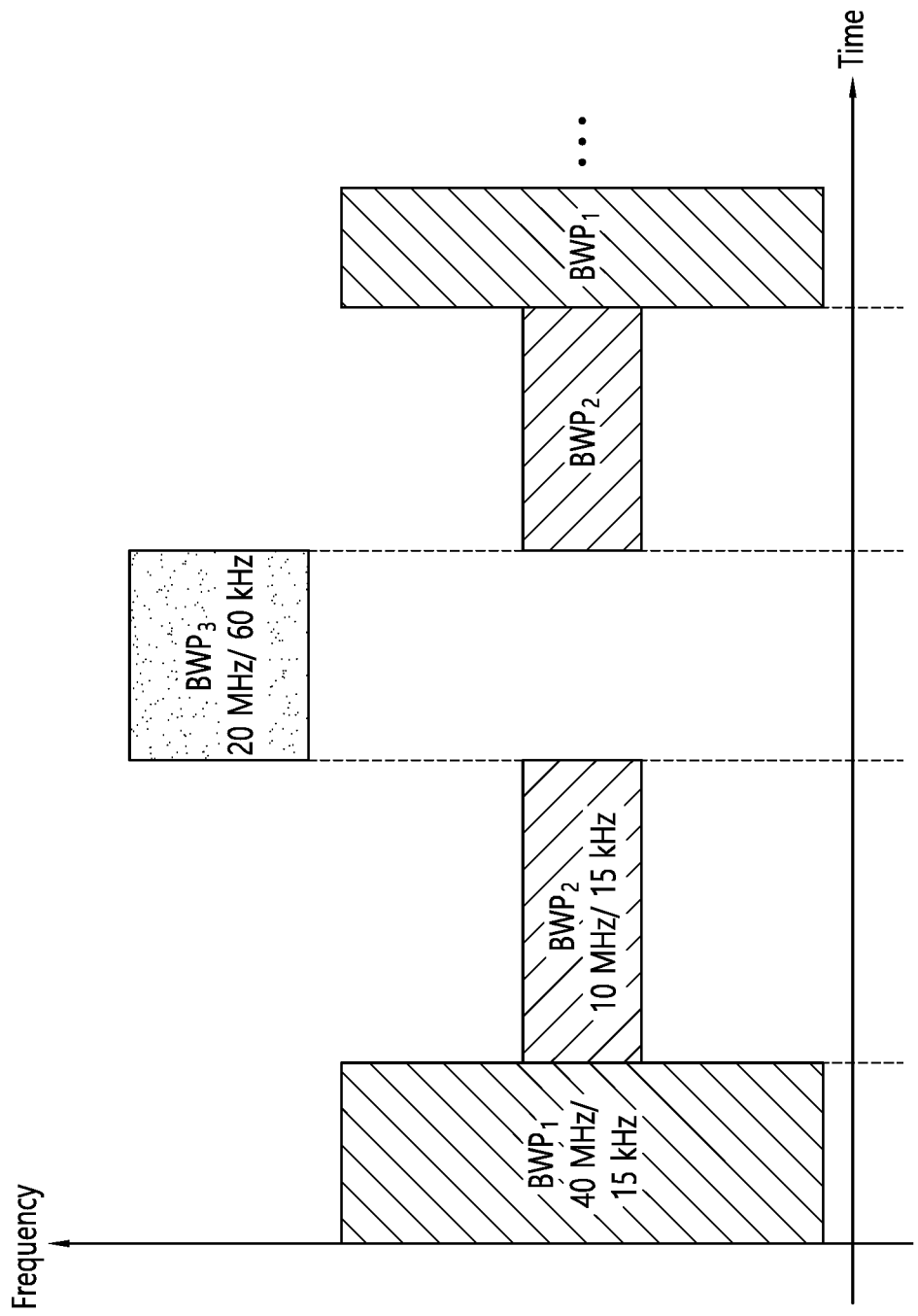
FIG. 8 shows an example of multiple BWPs to which technical features of the present disclosure can be applied.

FIG. 8 shows an example of multiple BWPs to which technical features of the present disclosure can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/ secondary CC (SCC).

Hereinafter, an initial access procedure and configuration in NR proposed by the present disclosure is described.

1. PSS/SSS/PBCH (i.e., SS/PBCH Block) Reception

Figure 9:
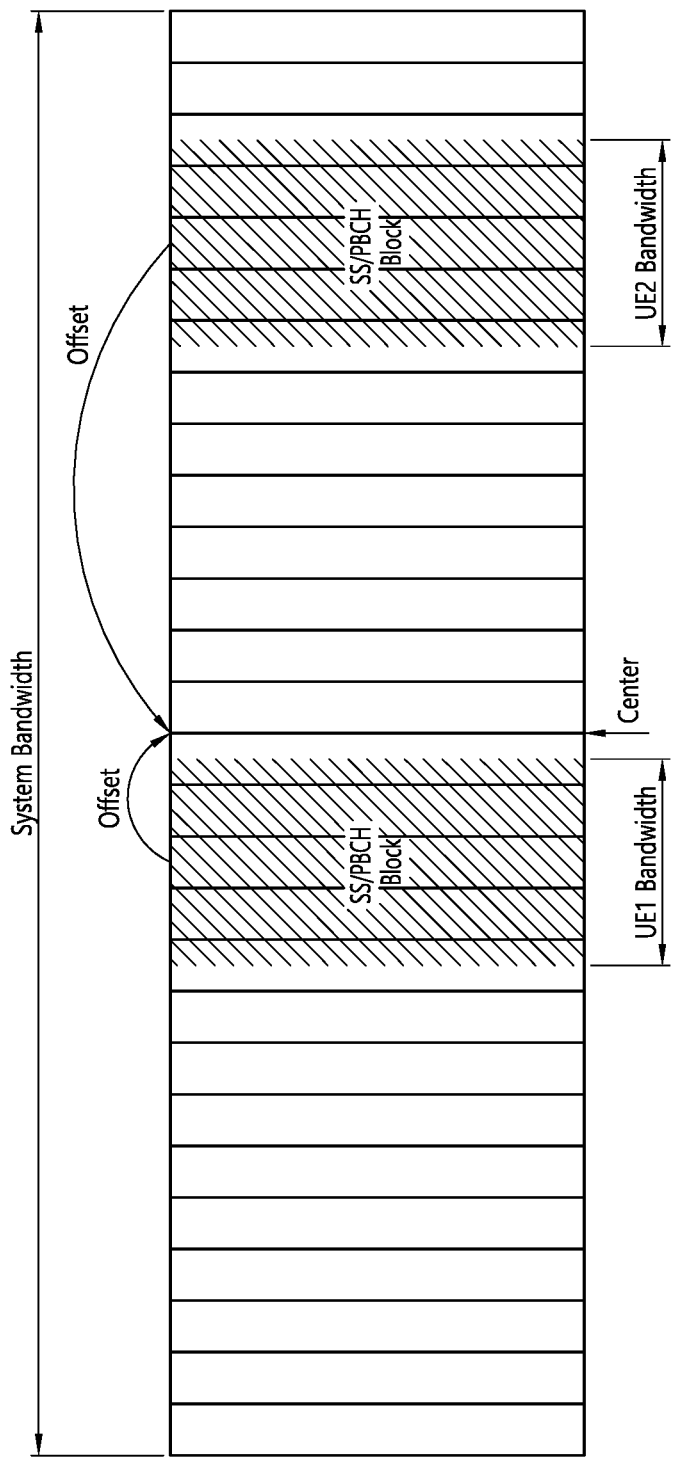
FIG. 9 shows an example of receiving an SS/PBCH block by different UEs according to an embodiment of the present disclosure.

FIG. 9 shows an example of receiving an SS/PBCH block by different UEs according to an embodiment of the present disclosure. An initial BWP (or anchor sub-band) including an SS/PBCH block may be changed based on a UE procedure. Referring to FIG. 9, a BWP1 including an SS/PBCH block read by UE1 differs from a BWP including an SS/PBCH block read by UE2, and both of the BWP1 and the BWP is smaller than a system bandwidth. A center of the two BWPs is spaced apart from a center of the system bandwidth by another offset.

When a CORESET for minimum system information (SI) or RMSI (hereinafter, RMSI CORESET) does not cover the SS/PBCH block, a default BWP may be configure to include an SS/PBCH block according to UE ability. That is, if a UE minimum bandwidth is greater than a sum of an RMSI bandwidth and an SS/PBCH block bandwidth, a RMSI CORESET and the SS/PBCH block are continuously multiplexed by frequency division multiplexing (FDM), an initial BWP may cover both of the RMSI CORESET and the SS/PBCH block. Otherwise, the initial BWP may cover the RMSI CORESET. After the network knows the bandwidth supported from the UE, the network may reconfigure a default BWP capable of including an SS/PBCH block and a necessary RMSI CORESET bandwidth in the UE. If the UE reads the SS/PBCH block, it may be assumed that the SS/PBCH block bandwidth is a UE bandwidth.

A PBCH included in the SS/PBCH block may include at least one of following information. However, following information may be transmitted through RMSI or UE specific signaling as well as a PBCH. In particular, with respect to a secondary cell (SCell), there is a need for UE specific signaling to transmit following information.

(1) Carrier Bandwidth:

Option 1: An MIB transmitted through a PBCH may include information on a carrier bandwidth. The information on a carrier bandwidth may have a size of 3 bits. The information on a carrier bandwidth may include information on a group of carrier bandwidths. For example, 5, 20, 40, 80, 100 MHz may be indicated in a bandwidth of below 6 GHz, and 100, 200, 400 MHz may be indicated at a bandwidth of above 6 GHz. A real bandwidth supported from the network may be also indicated. The information on a carrier bandwidth may include information on a potential maximum bandwidth in which a carrier is operated. That is, since the indicated carrier bandwidth is the potential maximum bandwidth, the UE does not need to assume the system bandwidth. Further, for future forward compatibility, several states and/or reserved fields may be used. The reserved field may indicate an additional maximum system bandwidth. A future UE may assume a sum of a first carrier bandwidth and an additional maximum system bandwidth indicated by the reserved field as a maximum system bandwidth.

Option 2: An MIB transmitted through a PBCH may not include information on a carrier bandwidth. However, the carrier bandwidth may be indicated by SI such as RMSI. For future forward compatibility, at least one field may be used to imply system information. In order to support disposal or change of a flexible network, no information on the system bandwidth may be indicated. When information on the system bandwidth is not indicated, a PRB indexing may be performed based on 1 GHz or a maximum bandwidth such as 400 PRB. For a future UE/network supporting 400 PRB or greater, PRB indexing may be performed while being divided into two groups of 0-399 and 400-X. A common data/control signal may be scheduled in a PRB having an index of 0~399, which is shared with a UE supporting a previous release. Another data/control signal may be scheduled at all PRBs. PRB indexing may be performed from a virtually lowest frequency. With respect to a greater subcarrier spacing, the maximum number of PRBs may be changed. For example, when a maximum system bandwidth is 400 MHz, the maximum number of PRBs based on a subcarrier spacing of 120 kHz is 278, and the maximum number of PRBs based on a subcarrier spacing of 240 kHz is 139.

(2) Offset Between a Center of an SS/PBCH Block and a Center of a System Bandwidth An MIB transmitted through a PBCH may include information on an offset between a center of an SS/PBCH block and a center of a system bandwidth. Since the center of an SS/PBCH block differs from the center of a system bandwidth, the above information may be indicated by the UE. The above information may be included in a PBCH regardless of whether information on the carrier bandwidth is included in the PBCH. When the information on the carrier bandwidth is included in the PBCH or an RMSI bandwidth is the same as a PBCH bandwidth, the PBCH may include information on an offset between the center of the SS/PBCH block and the center of the system bandwidth. Meanwhile, when the system bandwidth is indicated by the RMSI or the RMSI is not located at the same bandwidth/frequency as that of the PBCH, the PBCH may include information on an offset between a center of a PBCH or a RMSI and a center of a system bandwidth instead of the information on offset between the center of the SS/PBCH block and the center of the system bandwidth. Further, for PRB indexing, an MIB transmitted through the PBCH may also include information on an offset between a PRB of the lowest index of the SS/PBCH block and a virtual PRB 0. In detail, the MIB transmitted through the PBCH may include a subcarrier (subcarrier 0) of the lowest index of the SS/PBCH block and a subcarrier (subcarrier 0) of the lowest index of a common RB.

Information on an offset between the center of the SS/PBCH block and the center of the system bandwidth may be expressed as a value with respect to a channel raster (or synchronization raster). If it is assumed that a channel raster is 100 kHz, following options may be considered.

Option 1: The option 1 uses a channel raster of {6, 8, 9, 10, 10} bit with respect to {5, 20, 40, 80, 100} MHz bandwidth in a frequency band below 6 GHz.

Option 2: The option 2 uses a synchronization raster using a channel raster and an offset.

Option 3: The option 3 uses a RB bandwidth using the number of subcarriers and an offset. When a gap between 2 SS/PBCH blocks is the same as multiple RBs bandwidth based on a numerology of PSS/SSS/PBCH, offset related information may be omitted.

If it is assumed that a channel raster is 240 kHz, or a plurality of subcarriers or at least one RB based on a numerology used for RMSI (or PSS/SSS/PBCH), following options may be considered.

Option 1: The option 1 uses a channel raster of {9, 10, 11} bit with respect to {100, 200, 400} MHz bandwidth.

Option 2: The option 2 uses a synchronization raster (e.g. 1440 kHz) of {7, 8, 9} bit with respect to {100, 200, 400} MHz bandwidth Option 3: The option 3 uses a RB bandwidth using the number of subcarriers and an offset. When a gap between 2 SS/PBCH blocks is the same as multiple RBs bandwidth based on a numerology of PSS/SSS/PBCH, offset related information may be omitted.

Information on an offset between a center of an SS/PBCH block and a center of the system bandwidth may be expressed as a positive value or a negative value according to whether the center of the system bandwidth is higher or lower than the center of the SS/PBCH block.

Meanwhile, the information on the carrier bandwidth is included in the PBCH, the information on an offset between a center of an SS/PBCH block and a center of the system bandwidth may be a maximum bit assuming a maximum bandwidth supported by a carrier.

As described above, the information on an offset between a center of an SS/PBCH block and/or a RMSI and a center of the system bandwidth, and/or information on an offset between a PRB (or subcarrier) of the lowest index of the SS/PBCH block and/or the RMSI and a PRB 0 (or subcarrier 0) of the system bandwidth may be indicated to the UE. Accordingly, the UE may perform common PRB indexing through the system bandwidth as well as PRB indexing in a BWP configured to the UE (i.e. local PRB indexing).

2. RMSI Reception

When there are a plurality of SS/PBCH blocks in an NR carrier, the following options may be considered in relation to RMSI transmission.

Each SS/PBCH block includes RMSI, and the RMSI can be located around the SS/PBCH block.

Each SS/PBCH block may include or may not include the RMSI. If each SS/PBCH block includes the RMSI, the RMSI may be located around the SS/PBCH block. A UE accessing the SS/PBCH block that does not include the RMSI may need to additionally search for another SS/PBCH block including the RMSI.

The locations of the RMSI and the SS/PBCH block may not be related to each other. The information on the location of the RMSI can be indicated by the PBCH.

Regardless of the location of the RMSI, each RMSI can indicate a minimum bandwidth of different UEs. For example, there may be a minimum bandwidth of K different UEs, and the minimum bandwidth of each UE may define a bandwidth of RMSI control signals and/or data. According to the indicated minimum bandwidth of the UE, the UE may determine whether the currently accessing SS/PBCH block is sufficient to receive the RMSI. For example, K=2, and any one value between {2 MHz, 20 MHz} can be indicated by 1 bit. Alternatively, the minimum bandwidth of the UE may be combined with location information for RMSI CORESET. For example, Table 4 is a table in which the location of the RMSI, the bandwidth of the RMSI, and the corresponding numerology are combined.

TABLE 4

| Index | RMSI Location | RMSI Bandwidth | Numerology |
|---|---|---|---|
| 1 | 0 (Same as SS/PBCH block) | 0 | 30 kHz |
| 2 | 0 (Same as SS/PBCH block) | 1 | 30 kHz |
| ... | | | |

From the viewpoint of the UE, the following options may be considered for the RMSI reception.

(1) The minimum bandwidth of the UE may be located around the SS/PBCH block, and the RMSI CORESET and the data of the RMSI may be located within the RMSI bandwidth. The information on the minimum bandwidth of the UE may be indicated by the PBCH. At this time, the RMSI may be located within the minimum bandwidth of the UE. The bandwidth information and/or location information of the RMSI CORESET may be indicated within the minimum bandwidth of the UE. In addition, one value may indicate that there is no RMSI within the minimum bandwidth of the UE. Then, the UE can search for the SS/PBCH block by subtracting the corresponding minimum bandwidth of the UE.

(2) The bandwidth of the UE can be changed according to the RMSI configuration. When the information on the offset between the RMSI and SS/PBCH block is indicated, the UE can widen the bandwidth to receive the RMSI within its own bandwidth. If the UE cannot widen its own bandwidth, the UE may switch to the frequency domain between [current SS/PBCH block and RMSI location—UE minimum bandwidth/2] to receive the RMSI. For example, if the minimum bandwidth of the UE is 20 RB and the current SS/PBCH block indicates that the RMSI CORESET is present at 100 RB after 20 RB, the UE can be sure that there is no SS/PBCH block within 100−20/2=90 from the center of the current SS/PBCH block. This is based on the assumption that the SS/PBCH block is transmitted around any one of the SS/PBCH blocks within the UE minimum bandwidth.

The SS/PBCH block that does not include the RMSI may indicate the information on the location of the nearest RMSI. In indicating the location of the RMSI, two values may be indicated. The first value is a coarse offset between the center of the current SS/PBCH block and the SS/PBCH block including the RMSI, and the second value is a fine offset between the SS/PBCH block including the RMSI and the RMSI CORESET. If the current SS/PBCH block is the SS/PBCH block including the RMSI, the coarse offset may be omitted. The unit of the coarse offset may be a multiple of the RB bandwidth, and/or a multiple of 10 MHz and/or a multiple of 100 MHz.

The offset between the SS/PBCH block and the RMSI may be an offset between the center of the SS/PBCH block and the center of the RMSI. Alternatively, the offset between the SS/PBCH block and the RMSI may be an offset between the lowest PRB of the SS/PBCH block and the lowest PRB (or highest PRB) of the RMSI.

On the other hand, when the SS/PBCH block and the RMSI use different numerologies, the number of RBs may be indicated by the offset based on the numerology having the smaller subcarrier spacing of the SS/PBCH block and the RMSI. Alternatively, when the SS/PBCH block and the RMSI use different numerologies, the number of RBs may be indicated by an offset based on the numerology of the RMSI. If the subcarrier spacing of the RMSI is greater than the subcarrier spacing of the SS/PBCH block, an offset needs to be indicated to align different numerologies. At this time, it may be desirable to use the numerology having the smaller subcarrier spacing of the SS/PBCH block and the RMSI. More generally, the UE may use the smallest subcarrier spacing in each frequency band. That is, the UE may use 15 kHz in a frequency range of 6 GHz or below (that is, frequency range (FR) 1), and may use 60 kHz in a frequency range of 6 GHz or above (that is, FR2). If the number of PRBs is odd, there may be a gap of ½ RB or a gap of ¼ RB between the lowest PRB of the SS/PBCH block and the lowest PRB (or highest PRB) of the RMSI. The gap between the lowest PRB of the SS/PBCH block and the lowest PRB (or highest PRB) of the RMSI can be indicated by a positive or negative offset.

Figure 10:
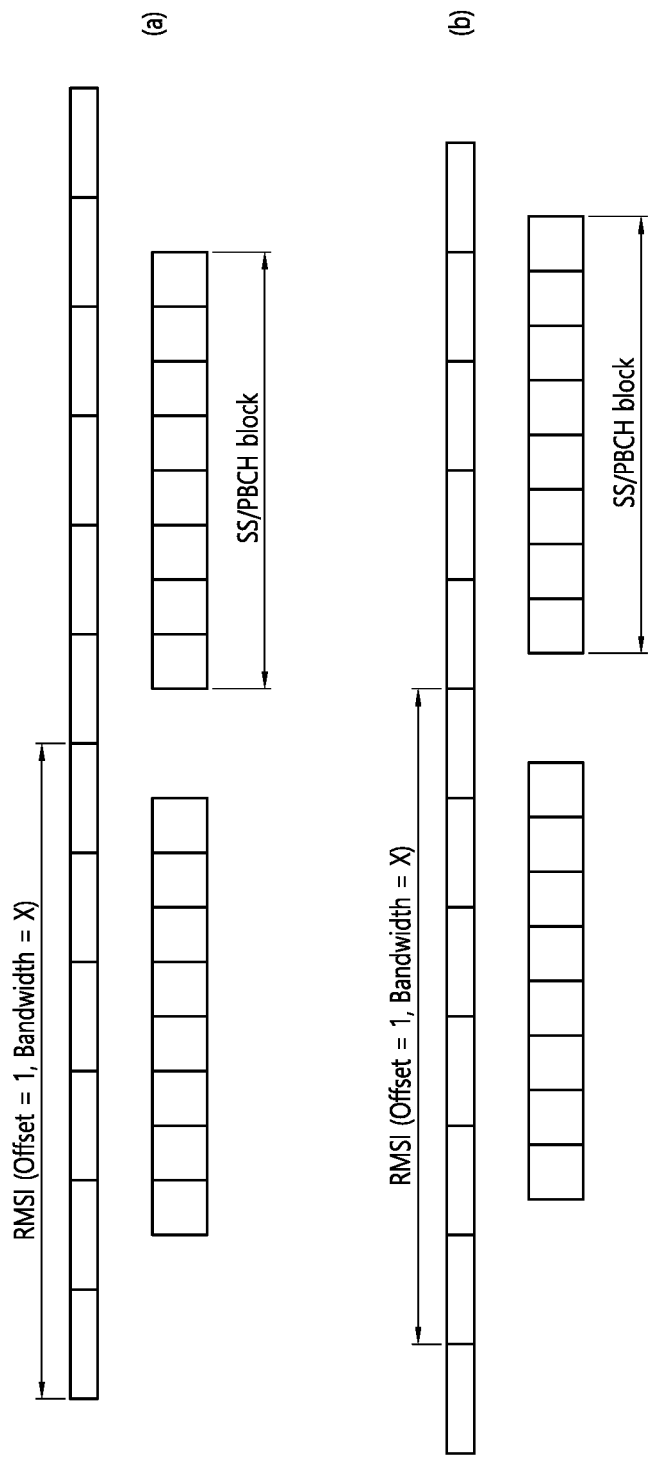
FIG. 10 shows an example of a relationship between the RMSI and the SS/PBCH block according to the embodiment of the present disclosure.

FIG. 10 shows an example of a relationship between the RMSI and the SS/PBCH block according to the embodiment of the present disclosure. FIG. 10-(a) illustrates a case in which the PRB grid of the RMSI and the PRB grid of the SS/PBCH block are aligned. FIG. 10-(b) illustrates a case in which the PRB grid of the RMSI and the PRB grid of the SS/PBCH block are not aligned.

Figure 11:
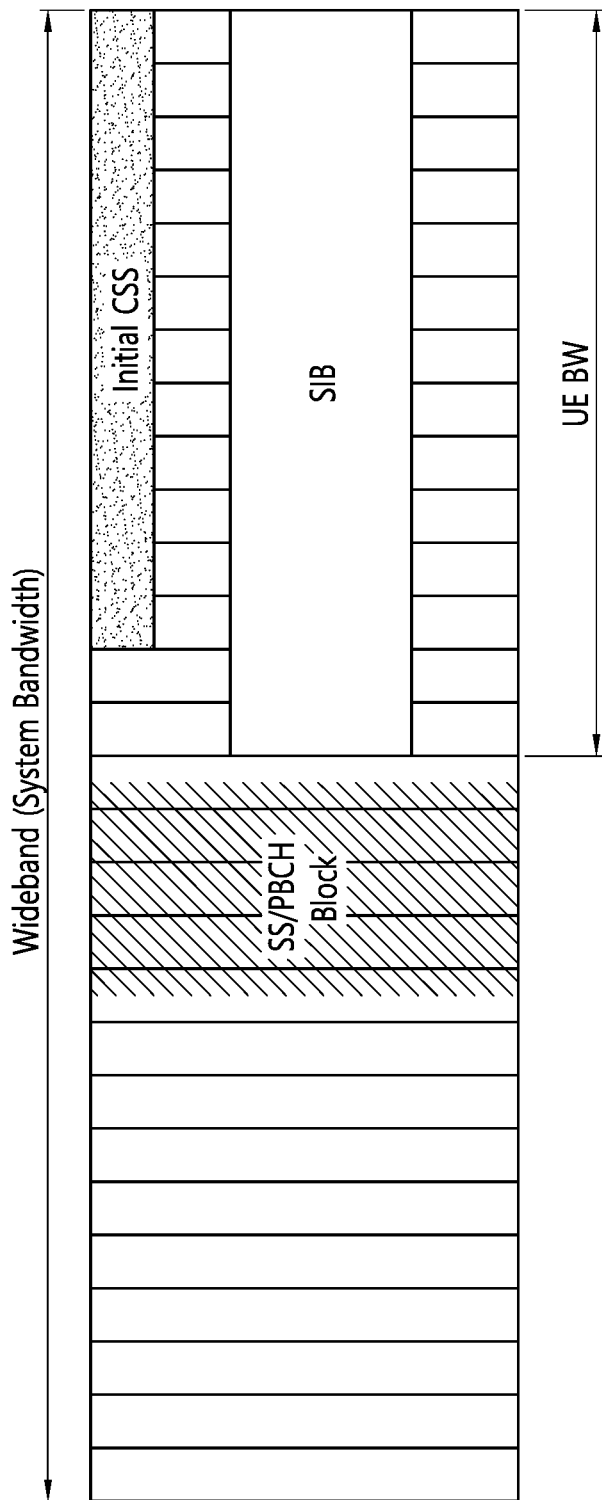
FIG. 11 shows an example of the RMSI reception according to the embodiment of the present disclosure.

FIG. 11 shows an example of the RMSI reception according to the embodiment of the present disclosure. Referring to FIG. 11, the SS/PBCH block is located within the system bandwidth, and the UE bandwidth is configured to be smaller than the system bandwidth. The SIB, i.e., the RMSI, is located within the UE bandwidth. The initial CSS will be described later.

(3) UE Bandwidth Configuration

The paired spectrum represents a band in which a DL carrier and a UL carrier are paired with each other. In the case of the paired spectrum, BWP is independently set in DL and UL. This may follow the content of the initial DL BWP and the content of the initial UL BWP, which will be described later.

The unpaired spectrum represents a band in which the DL carrier and the UL carrier are included in one band. In the case of the unpaired spectrum, DL BWP and UL BWP are set in pairs. Therefore, it is necessary to clearly establish the relationship between the DL BWP and the UL BWP in the initial BWP.

The same set of BWPs may be configured for physical random access channel (PRACH) and random access response (RAR) (and/or for MSG3 and MSG4/CORESET for retransmission). That is, the UE bandwidth configuration can be used for both MSG3 and RAR. To this end, it may follow a configuration of the CORESET for the RAR (hereinafter, RAR CORESET) or a BWP configuration related to PRACH. Similarly, alignment between PUCCH for the MSG4 or the MSG3 and the CORESET for retransmission of MSG4 is required, and one configuration can be used for both. Alternatively, different configurations may be used between the CORESET and the UL BWP, but the total bandwidth should exist within the UE bandwidth.

To reduce overhead of the configuration, if the PRACH configuration is different from the RMSI CORESET, the same CORESET configuration (for example, starting OFDM symbol and/or length) can be applied to the RAR CORESET. If the frequency location of the PRACH resource is different from the RMSI, an implicit or separate RAR CORESET may be configured. When the implicit RAR CORESET is configured, the frequency of the DL may shift to the center of the PRACH resource. Alternatively, a separate CORESET combined with the PRACH configuration may be configured.

That is, CSS0 (i.e., RMSI CORESET), CSS1 (i.e., RAR CORESET), CSS2 (i.e., CORESET for MSG4) may be individually configured, but may be aligned with a PRACH configuration or an MSG3 configuration. When the UE receives the RMSI, the initial BWP may be the bandwidth of the CSS0. When the UE performs PRACH transmission/RAR reception, the initial BWP may be a union of a bandwidth of CSS1 and a frequency domain for PRACH. When the UE performs MSG3 transmission/MSG4 reception, the initial BWP may be a union of a bandwidth of CSS2 and a frequency domain for MSG3. In addition, a configuration for MSG4 retransmission and/or a configuration for PUCCH for MSG can be considered in a similar scheme.

(4) Initial DL BWP

The following various options may be considered for the initial DL BWP.

Option 1: Based on the initial CSS configuration (for example, RMSI CORESET)

When the RMSI CORESET is shared with other search spaces, the initial DL BWP can be determined by the CORESET resource used to monitor CSS and/or RMSI-RNTI. When the initial CSS is configured, it can be assumed that the UE bandwidth is as large as the bandwidth of the initial CSS. If the UE knows the system bandwidth, the UE bandwidth may be determined by a minimum value of [initial CSS bandwidth, bandwidth supported by UE] and/or a maximum value of [initial CSS bandwidth, bandwidth supported by UE].

Option 2: Based on initial system information bandwidth configuration (that is, separate configuration)

Option 3: Minimum bandwidth of UE

The minimum bandwidth of the UE may be defined for each frequency range. The minimum bandwidth of the UE may be defined as a bandwidth for an initial access procedure up to at least a random access procedure. The UE minimum bandwidth can be equally applied to paging. That is, the UE minimum bandwidth may be applied to RMSI, random access related procedures until at least RAR, MSG4, paging, etc., are received.

If the UE is reconfigured with different data monitoring spaces for different CORESET or RAR, MSG4, etc., the initial DL BWP can be changed. Also, the initial DL BWP may be reconfigured to a default BWP. Alternatively, a default BWP that may be the same or different from the initial DL BWP may be configured.

(5) Initial UL BWP

The following various options may be considered for the initial UL BWP.

Option 1: The initial UL BWP may be determined based on the PRACH transmission bandwidth and frequency according to the selected PRACH configuration. If the UE is also configured with a BWP for MSG3 transmission, the initial UL BWP can be changed to the BWP for MSG3 transmission.

Option 2: In order to support the UL BWP for MSG3 transmission, a separate configuration for frequency/bandwidth of the UL BWP for MSG3 transmission may be required. If no separate configuration is given, the bandwidth for PRACH transmission may be used as the bandwidth for MSG3 transmission, or the same UL BWP assuming a fixed TX-RX gap (or duplex gap) may be configured as the initial UL BWP.

Option 3: The minimum bandwidth of the UE centered on the bandwidth for PRACH transmission may be configured as the initial UL BWP. The UE minimum bandwidth may be different for each frequency range (for example, 5 MHz or 20 MHz). The BWP configuration for MSG3 transmission may configure only the numerology and/or the center frequency or the lowest frequency used for MSG transmission. Accordingly, the UE can know that the initial UL BWP is always the same as the UE minimum bandwidth from the indicated frequency location. Any PUCCH resource configuration in the initial UL BWP can be configured relative to the initial UL BWP. The numerology for the PUCCH for MSG4 within the initial UL BWP and/or the numerology for other messages may be the same as the numerology for MSG3. That is, if different numerologies are used, a separate configuration may be required.

That is, in the resource configuration for the PUCCH for PRACH, MSG3 and/or MSG4, only frequency information (that is, offset) on the indicated UL frequency may be indicated. In the viewpoint of the offset, the indicated UL frequency may be a frequency in which PRB grids of different numerologies are aligned. That is, the indicated UL frequency may be subcarrier 0 in a given numerology. Alternatively, the indicated UL frequency may be a frequency in a reference numerology (for example, numerology of the SS/PBCH block). If the given numerology is not aligned at the indicated UL frequency, the information on the additional offset may be further indicated. At this time, the bandwidth of the initial UL BWP may be the UE minimum bandwidth. If there is a UE that supports only a bandwidth smaller than the UE minimum bandwidth, explicit signaling for the bandwidth may be further considered. Different bandwidths may be configured for UEs having different UE minimum bandwidth capabilities.

Alternatively, frequency and bandwidth information may be indicated. As described above, even in this case, a separate configuration may be considered for UEs having different UE abilities.

The above-described frequency information can be used to indicate common PRB indexing and/or offset between UL frequency and virtual PRB 0.

For common PRB indexing in UL, the following options can be considered.

UL frequency may be indicated separately. The information on the offset between the UL frequency and the virtual PRB may be indicated. The offset may be configured based on the numerology of the SS/PBCH block and/or the numerology corresponding to the 15 kHz subcarrier spacing and/or the numerology corresponding to the smallest subcarrier spacing available within the frequency band/range. The information on the offset may be indicated through the RMSI.

The UL frequency may be indicated for each PRACH configuration. At this time, the offset may be indicated through other SI or UE specific signaling on the premise that only local PRB indexing is used. However, for the MSG3 transmission, it may be desirable to indicate the information on the offset between the UL frequency and the virtual PRB 0 through the RMSI.

(6) Scrambling

In perspective of scrambling of a control signal/data/RS in a BWP of the UE and/or RS generation and/or common data scheduling in an initial CSS, if the UE knows the system bandwidth, scrambling of a control signal/data/RS in a BWP of the UE and/or RS generation and/or common data scheduling in an initial CSS may be performed based on the system bandwidth and a common PRB indexing. This means that a sequence for scrambling of a control signal/data/RS and/or RS generation and/or common data scheduling in an initial CSS is generated across whole PRBs in the system bandwidth. If the UE does not know a system bandwidth, scrambling of the control signal/data/RS in a BWP of the UE and/or RS generation and/or common data scheduling in initial CSS may be performed based on a configured bandwidth (i.e. initial BWP) and local PRB indexing. This means that a sequence for scrambling of the control signal/data/RS and/or RS generation and/or common data scheduling in the initial CSS is generated across PRBs in the BWP.

If information on an offset for a common PRB indexing is provided from an RMSI instead of RMSI CORESET, common PRB indexing may be used for scrambling of the control signal/data/RS and/or RS generation and/or common data scheduling. When a RMSI CORESET is shared for another RNTI monitoring, local scrambling/PRB indexing may be used for RMSI control signal/data monitoring and common scrambling/PRB indexing may be used for monitoring another channel (non-RMSI control signal/data).

In order to minimize burden of channel estimation, if a CORESET is configured together with a wideband and a RMSI CORESET is shared with another transmission, local scrambling/PRB indexing may be always used. That is, RS sequence related parameters (e.g. length, an offset and the like) may be configured per CORESET. Such a method may be applicable to only a case of configuring a wideband. That is, if the wideband is configured, RS sequence related parameters (e.g. length, offset and the like) may be explicitly or implicitly configured per CORESET. For example, when a wideband is used as a default, local scrambling/PRB indexing may be used with respect to RMSI CORESET. A similar scheme may be applicable to generation of an RS sequence. With respect to data, different RS sequences may be generated/used according to whether the UE knows a common PRB indexing. For example, a RMSI PDSCH may use an RS sequence based on local PRB indexing. Another PDSCH may use an RS sequence based on common PRB indexing.

Or, local scrambling/PRB indexing may be used for transmission of all common control signals. In order to transmit common data, one of local scrambling/PRB indexing and common scrambling/PRB indexing may be used. Common scrambling/PRB indexing may be used to transmit non-common control signal/data such as group common or UE specific signaling. Scrambling and/or DM-RS sequence related parameter/configuration may be performed per BWP, and the initial DL/UL BWP may assume local scrambling/PRB indexing. Scrambling of the control signal/data/RS and/or RS generation and/or common data scheduling at initial CSS may be performed based on a maximum system bandwidth. This is for the purpose of future forward compatibility, and the maximum system bandwidth may be defined as K times of an actual maximum system defined per frequency band or per frequency range. Resource allocation for data scheduling may be performed based on a configured bandwidth (i.e. initial BWP). That is, regardless of common PRB indexing based on a system bandwidth or a potential maximum system bandwidth, resource allocation for data scheduling may be performed based on local PRB indexing.

Figure 12:
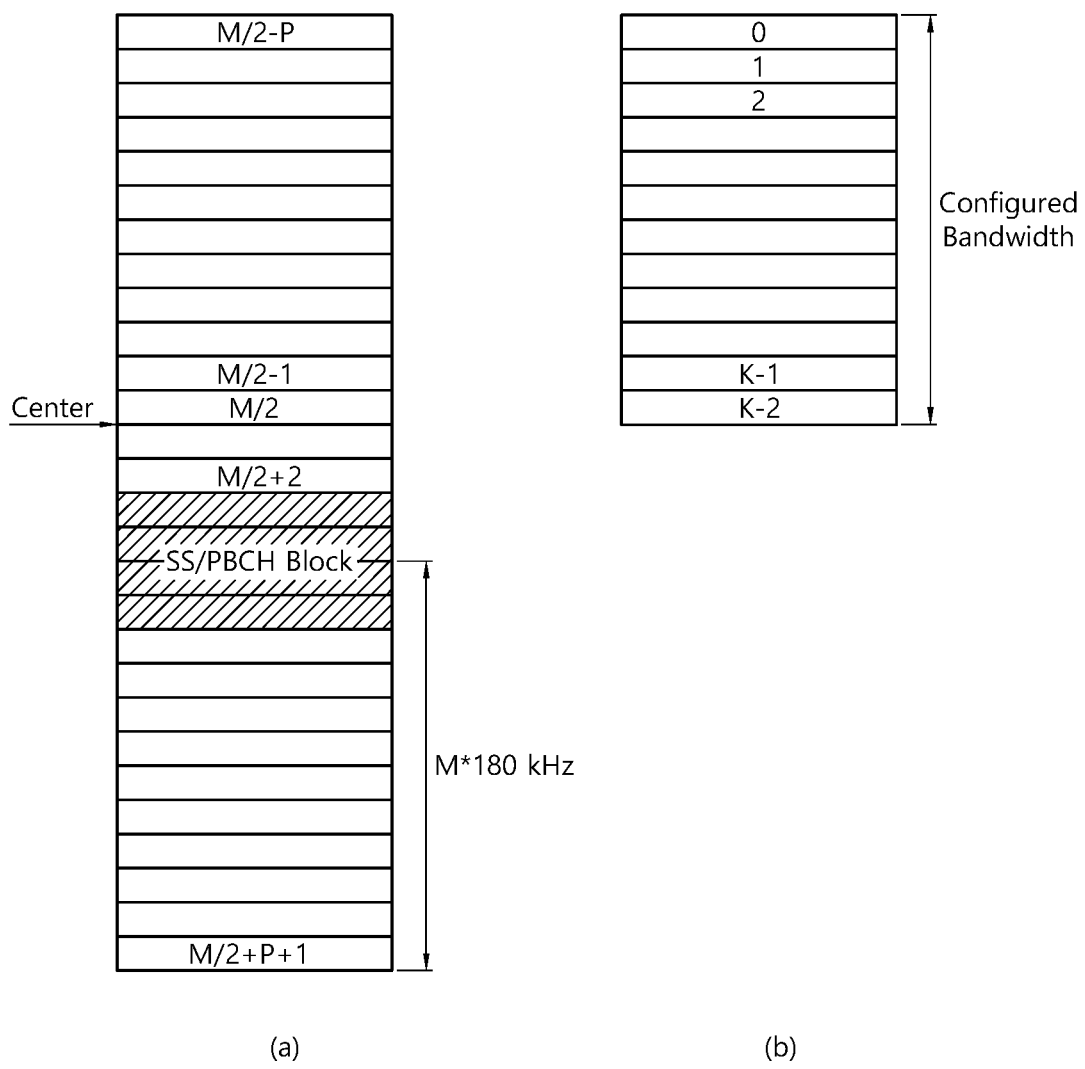
FIG. 12 shows an example of reception of an SS block according to an embodiment of the present disclosure.

FIG. 12 shows an example of reception of an SS block according to an embodiment of the present disclosure. FIG. 12-(a) illustrates a system bandwidth, and a common PRB indexing for PRBs included in the system bandwidth is defined. The center of the system bandwidth does not correspond to the center of the SS block. Accordingly, information on an offset between the center of the SS block and the center of the system bandwidth or information on an offset between a PRB of the lowest index of the SS block and a PRB 0 of the system bandwidth may be indicated to the UE. It is assumed in FIG. 12-(a) that a center of the SS block is arranged at a synchronization raster of 15 kHz. FIG. 12-(b) illustrates a bandwidth configured to the UE, i.e. BWP, and a local PRB indexing for the PRB included in a BWP is defined. Regardless of common PRB indexing, resource allocation for data scheduling may be performed based on local PRB indexing.

(7) How to configure CORESET for CSS when system bandwidth is unknown

Option 1: It may be configured based on the bandwidth assuming that the center of the SS/PBCH block or the center of the system bandwidth is the center of the CORESET for CSS. At this time, the bandwidth may be fixed for each frequency range and/or for each frequency band.

Option 2: Under the assumption of the maximum system bandwidth, a set of PRBs may be configured.

Option 3: Assuming continuous CSS, the center of the CORESET for CSS (or the offset between (the center of) the SS/PBCH block and the CSS center) and/or the bandwidth can be configured. At this time, the PRB indexing may be based on the maximum bandwidth.

When the CSS is configured, in addition to the set of PRBs in which the CSS is used, a transmission scheme and a virtual cell ID can be configured. For the virtual cell ID, an offset value that can be added to the physical cell ID can be signaled. Alternatively, the virtual cell ID may be configured based on the cell ID detected from the PSS/SSS and the SS/PBCH block index indicated by the PBCH.

In the CSS configuration, restrictions between the detected center frequency of the SS/PBCH block and the CSS may be different depending on the UE bandwidth. For example, if only the UE supports 100 MHz, the initial CSS needs to be configured for coherent bandwidth where the UE synchronization can be maintained. Therefore, it may generally be desirable to configure the initial CSS around the SS/PBCH block as in option 3 described above. When the option 1 or the option 2 is used, the offset between (the center of) the SS/PBCH block and the center of the CSS may be limited by the lowest UE bandwidth accessing the cell. When the offset between (the center of) the SS/PBCH block and the center of the CSS is greater than the coherent bandwidth, the UE may search for the PSS/SSS again around the initial CSS.

In addition, the information on the time resource of the initial CSS may be indicated through the PBCH. A plurality of patterns for time resources of the initial CSS may be configured by the PBCH. More specifically, when a plurality of beams are used, a slot index through which each beam can be transmitted may be different. At this time, for the time resources and/or patterns of the initial CSS, only the period may be configured, and the offset for slot 0 and/or a reference slot index and/or a reference subframe index may be determined based on the SS/PBCH block index (or SS burst index) indicated in the PBCH. That is, an explicit configuration for the period and an implicit configuration for the offset based on the SS/PBCH block index (or SS burst index) can be used to determine the transmission location of the RMSI CORESET.

The number of beams per slot (i.e., a mechanism for determining an offset) may be determined according to the OFDM symbol period of the RMSI CORESET. If the OFDM symbol period of the RMSI CORESET is a plurality of OFDM symbols, one or more beams may be mapped to each slot. For example, when the transmission period of the RMSI CORESET is 20 ms, there are 16 SS/PBCH blocks, and one slot is mapped to one beam index, a total of 16 slots starting from slot 0 may be allocated for potential RMSI transmission. In addition, information on a start slot index may be indicated for RMSI transmission. Alternatively, two or more beams may be mapped to each slot.

The bandwidth of the initial CSS can be fixed. The bandwidth of the initial CSS may be different for each frequency band or for each frequency range. Unless fixed like the SS/PBCH block, the center of the initial CSS can be indicated. Alternatively, the center of the initial CSS may be fixed to the SS/PBCH block (for example, right next to the SS/PBCH block).

(8) Wideband RS Transmission

For example, it may be desirable to indicate the actual bandwidth to which the wideband RS will be transmitted, for a wideband RS for channel estimation and/or a tracking RS and/or a CSI-RS, etc. However, the UE does not need to perform measurements beyond the configured bandwidth monitored by the UE. That is, the configuration of the RS can be indicated to the UE, and the UE can perform necessary functions within the UE specific bandwidth configured for the CSS and USS control/data. To this end, for example, the bandwidth of each wideband RS transmission may be indicated UE-specifically, not group-commonly or cell-specifically. In addition, the wideband RS may be transmitted based on common PRB indexing that can cover even beyond the BWP of the UE. At this time, the bandwidth in which the wideband RS is transmitted may be greater than the actual UE bandwidth.

The scrambling of the wideband RS can be based on the center frequency of the carrier and/or the common PRB indexing (from the network perspective). Accordingly, the UE can access the wideband RS regardless of the bandwidth configured by the network. Alternatively, the length and/or offset of the wideband RS sequence may be indicated. Accordingly, the wideband RS may be mapped from the first RB of the bandwidth configured for each UE and/or each UE group based on the configured bandwidth and/or configured RS parameters. For example, the length of the wideband RS sequence may be 2*N, and N may be 800 when considering up to 400 PRBs and 2 REs per each RB. Depending on the offset K of the wideband RS sequence, the wideband RS sequence [K+1, K+bandwidth] may be mapped to the UE according to the configured bandwidth.

(9) RS Transmission for Supporting Multi-User (MU)-Multiple-Input Multiple-Output (MIMO) Between UEs Configured with Different Bandwidths A scheme similar to the wideband RS may be used to generate RS sequences for MU-MIMO between UEs having differently configured bandwidths. At this time, the length and/or offset of the RS may be semi-statically configured together with the BWP configuration. Alternatively, the length and/or offset of the plurality of RSs may be semi-statically configured, and one configuration of them may be dynamically selected/indicated.

In addition, the offset between the first PRB of the system bandwidth and the first PRB of the SS/PBCH block (or RMSI CORESET bandwidth) initially accessed by the UE may be indicated to the UE through UE specific signaling and/or UE group common signaling and/or cell specific signaling. Alternatively, the offset between the center frequency of the system bandwidth and the center frequency of the SS/PBCH block (or RMSI CORESET bandwidth) initially accessed by the UE may be indicated to the UE through the UE specific signaling and/or the UE group common signaling and/or the cell specific signaling. Based on this information, the UE can calculate different offsets for different BWP configurations.

If the plurality of numerologies are supported on the NR carrier, the information on the offset between the first PRB of the system bandwidth and the first PRB of the SS/PBCH block (or RMSI CORESET bandwidth) initially accessed by the UE or the offset between the center frequency of the system bandwidth and the center frequency of the SS/PBCH block (or RMSI CORESET bandwidth) initially accessed by the UE may be given based on numerology used in the PBCH or the RMSI. Alternatively, separate lengths and offsets may be configured for each numerology. Alternatively, by sharing virtual PRB 0 between different numerologies, RS sequences of different lengths can be considered. The maximum length of the RS sequence should be able to cover the maximum number of PRBs (and potentially multiples of the maximum number of PRBs). At this time, the length of the RS sequence can be very large. Alternatively, the information on the length of the RS sequence starting from the first PRB of the virtual PRB 0 and/or the first PRB of the UE specific BWP and/or the first PRB of the configured UE BWP and/or the first PRB of the SS/PBCH block and/or the first PRB of the default BWP configured for the UE can be indicated to the UE. A similar scheme can be applied to both DL and UL.

3. PRACH/RAR Transmission

Figure 13:
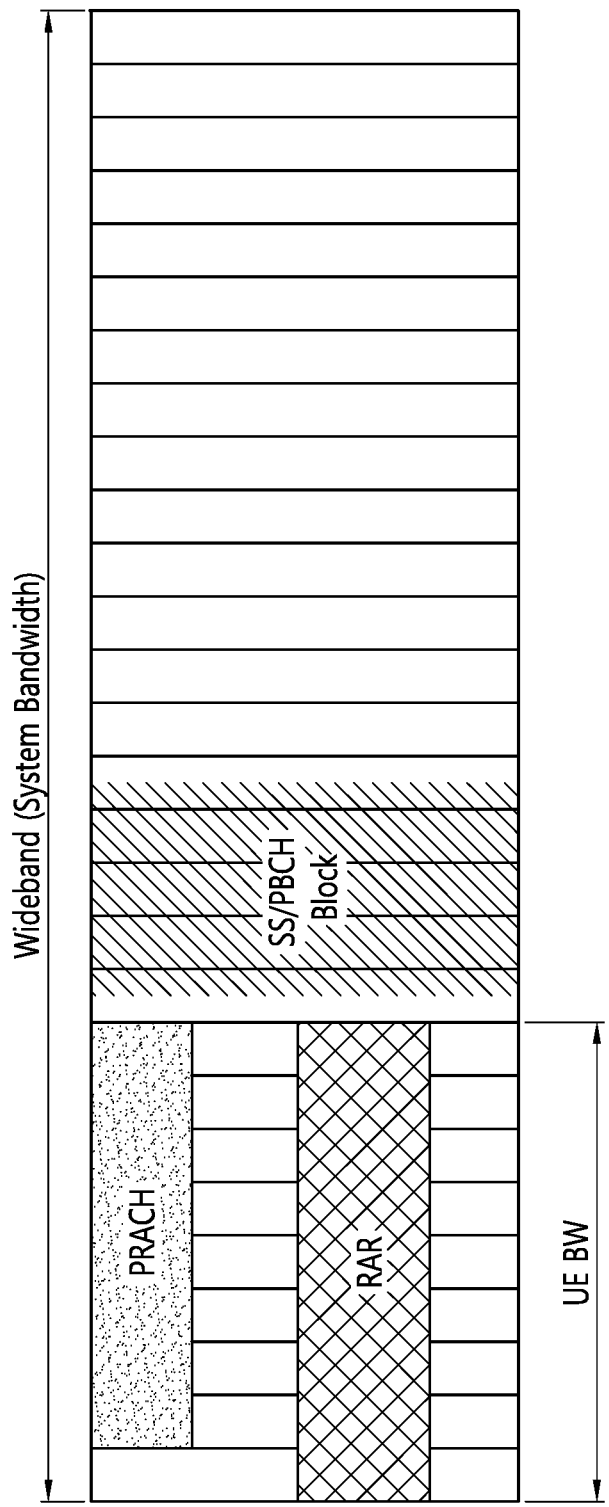
FIG. 13 shows an example of the PRACH/RAR transmission according to the embodiment of the present disclosure.

FIG. 13 shows an example of the PRACH/RAR transmission according to the embodiment of the present disclosure. Referring to FIG. 13, a frequency domain for PRACH/RAR transmission exists within the UE bandwidth. Hereinafter, a detailed configuration for PRACH/RAR transmission according to the present disclosure will be described.

(1) PRACH Resource Configuration (in Particular, in Unpaired Spectrum)

Similar to the case where the SS block and the RMSI CORESET are multiplexed with FDM, the UE minimum bandwidth needs to be considered in configuring the PRACH resource. When the PRACH resource is configured outside the SS/PBCH block, it may be desirable that the total bandwidth including both the PRACH resource and the SS/PBCH block is smaller than the UE minimum bandwidth. This is because the UE can perform the measurement on the SS/PBCH block while performing the PRACH transmission. This is similar to RMSI CORESET/RMSI monitoring. Meanwhile, in the configuration of the PRACH resource, retuning of the PRACH resource is not considered.

In the configuration of the PRACH resource, the following can be considered.

If a DL/UL configuration is given in the RMSI, there may be K PRACH resource candidates for a fixed UL slot. K may be determined based on the PRACH format. There may be L PRACH resource candidates for the partial UL slot. If the semi-static configuration is given, only the semi-static UL slot can be used for the PRACH configuration in the RMSI.

If the DL/UL configuration is not given in the RMSI and the actually transmitted SS/PBCH block is given, the PRACH resource may not be configured in the actually transmitted SS/PBCH block and/or the OFDM symbols which is DL resource before the SS/PBCH block. OFDM symbols after the SS/PBCH block and/or the slot without the SS/PBCH block may be used as the PRACH resource.

Similar to the SS/PBCH block, the potential PRACH resource can be indexed based on the PRACH format. Then, the actually indicated/used PRACH resource can be indicated in the time domain. In addition, the frequency/preamble resources may be additionally indicated.

When the PRACH resource is configured outside the SS/PBCH block, the following may be considered for DL BWP.

In the paired spectrum, an independent BWP between DL and UL may be configured.

In the unpaired spectrum, the DL BWP can be paired with a UL BWP for PRACH resource and/or MSG3 transmission. Alternatively, the UE may change the BWP in PRACH transmission, RAR reception, MSG3 transmission, etc. When the UE changes the BWP in the PRACH transmission, the RAR reception, the MSG3 transmission, etc., a sufficient gap needs to be supported to change the initial BWP. Since the UE can return to the initial DL BWP including the SS/PBCH block after transmitting the PRACH and continuously perform measurements on the SS/PBCH block (in particular, in the case of multi-beam), it may be more preferable for the UE to change the BWP. Accordingly, the initial BWP in the unpaired spectrum may be defined as the BWP of the initial DL BWP or the initial UL BWP. That is, when the UE performs the UL transmission (for example, PRACH transmission and/or MSG3 transmission), the initial BWP may be defined as the initial UL BWP. Otherwise, the initial BWP may be defined as the initial DL BWP.

For the initial UL BWP, unless otherwise configured, the PRACH resource may be the initial BWP. The minimum UL BWP of the UE may be the UE minimum BWP (resource allocation and smaller bandwidth supported by the network can be processed) centered on the PRACH resource. Alternatively, the initial UL BWP may be configured separately within the RMSI and/or RAR. When the RMSI configuration is used, the initial UL BWP may be configured for each PRACH resource and/or for each carrier and/or for each UL frequency. For example, two separate initial UL BWP configurations may be used for UL carrier and supplemental UL (SUL) frequencies.

When the PRACH resources are shared between different UEs accessing different SS/PBCH blocks, there may be confusion for the BWP for RAR. To this end, any of the following can be considered.

BWPs for different RARs may be configured in different UEs.

Each SS/PBCH block may have different PRACH configurations. Thus, RAR can only be read in the associated SS/PBCH block. Alternatively, separate PRACH preambles and/or PRACH resources may be indicated for each SS/PBCH block.

The UE may return to the initial DL BWP for the RAR reception. Since the network does not know where the UE monitors the RAR, the RAR can be copied on a plurality of SS/PBCH blocks sharing the same PRACH resource.

The UE may stay in the initial UL BWP, and the RAR configuration may include SS/PBCH blocks or inherit all of the rest except for only the frequency location in the initial DL BWP around the SS/PBCH block. That is, the UE can expect to receive the RAR in the same BWP as the PRACH without retuning. This can be realized with another distinct BWP configuration for RAR CORESET/data monitoring. For example, a separate PRACH configuration may be used between UEs having different UE bandwidth capabilities, and a BWP for a separate RAR for each PRACH configuration may be considered regardless of the SS/PBCH block used for initial access.

In a separate RAR configuration for alignment with PRACH (for example, RAR CORESET and/or BWP for RAR reception), the information on the SS/PBCH block may be included in the BWP for RAR. Given this information, the UE can change to the indicated SS/PBCH block. This can be seen as an implicit handover.

In addition, the center frequency of the SS/PBCH block and/or the lowest PRB may be indicated with or without the information on the SS/PBCH block actually being transmitted. Unless indicated otherwise, it may be the same time domain information including a beam index for each symbol and/or for each SS/PBCH block. Alternatively, the network may configure separate information.

When a new SS/PBCH block is configured, the UE can change a serving cell. Also, at least the cell ID can be shared, so the UE does not need to change the cell ID. From the viewpoint of the UE, all procedures can be performed assuming that the new SS/PBCH block is an SS/PBCH block initially accessed.

In summary, the PRACH resource not included in the initial DL BWP in the unpaired spectrum may be configured as the frequency location of the initial access SS/PBCH block in which the same configuration is used except for the frequency location. At this time, the UE may change the initial SS/PBCH block to a new SS/PBCH block. Other operations based on common PRB indexing and RMSI can be applied based on the frequency location of the RMSI from the beginning of the SS/PBCH block. Also, if necessary, an offset between two SS/PBCH blocks can be considered.

Figure 14:
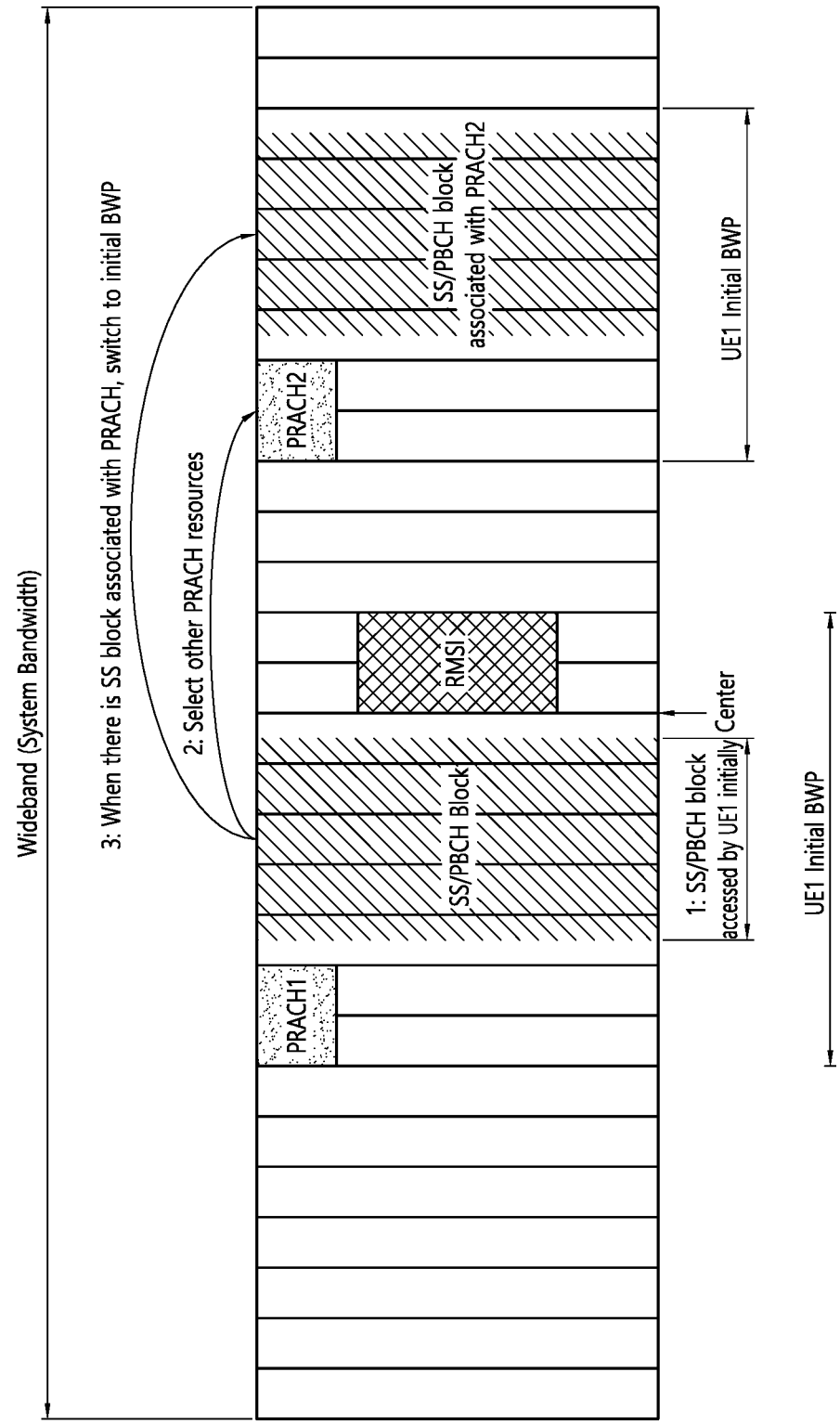
FIG. 14 shows another example of the PRACH/RAR reception according to the embodiment of the present disclosure.

FIG. 14 shows another example of the PRACH/RAR reception according to the embodiment of the present disclosure. The above-described present disclosure can be illustrated in FIG. 14. The new SS/PBCH block may or may not have the RMSI transmission in the associated initial DL BWP.

(2) RAR CSS Configuration
Option 1: Separate RAR CSS configuration for each PRACH resource
Option 2: Sharing RAR CSS configuration regardless of PRACH resource
Option 3: RSS shared with initial CSS
(3) Indication of UE Bandwidth Through PRACH: Separate Resources (Time, Frequency, and/or Code) May be Indicated for Each UE Bandwidth.

4. MSG3/MSG4 transmission
Option 1: Configuration of CSS for MSG4 and/or BWP for MSG3 via RAR
Option 2: CSS configuration for MSG4 in SIB (or RMSI)
Option 3: CSS for MSG4 shared with initial CSS
Option 4: CSS for MSG4 shared with RAR CSS Various options can be considered for the MSG3 as described above. That is, various options, such as considering the UE minimum bandwidth, indicating the explicit signaling, and/or using the same bandwidth as the PRACH bandwidth, may be considered.

5. UE Specific Configuration

Figure 15:
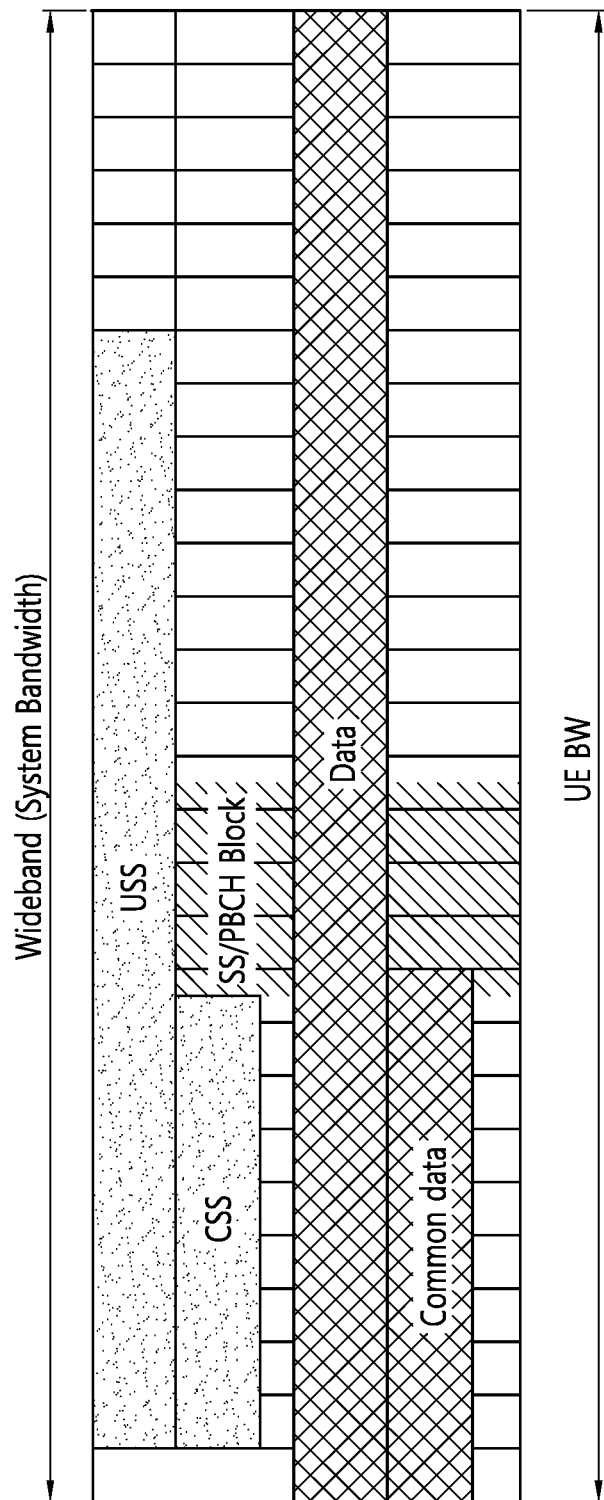
FIG. 15 shows an example of a UE specific configuration according to an embodiment of the present disclosure.

FIG. 15 shows an example of a UE specific configuration according to an embodiment of the present disclosure. Referring to FIG. 15, a frequency domain for the USS exists in the UE bandwidth separately from the CSS described above. Hereinafter, a detailed configuration of the UE specific configuration according to the present disclosure will be described.

(1) DL BWP-UL BWP Pairing Handling in Unpaired Spectrum

The DL BWP and the UL BWP may have different numerologies, and the center frequency may be defined by the UL based on the configuration. At this time, the DL BWP may be defined as [first PRB+bandwidth] based on common PRB indexing. The UL BWP may also be defined as [first PRB+bandwidth] based on common PRB indexing. The first PRB in the DL and the UL may be different, and the bandwidth may also be different. The UE can take the center of the union of DL BWP and the UL BWP. When the DL BWP and the UL BWP have different numerologies, the slot format may be configured separately for the DL and the UL, respectively. Alternatively, when the DL BWP and the UL BWP have different numerologies, the slot format may be configured based on any one of the DL numerology and the UL numerology.

(2) When the DL BWP having the normal CP and the UL BWP having the extended CP are configured in pairs in the unpaired spectrum, the DL BWP having the normal CP and the UL BWP having the extended CP may have different slot sizes. To solve this, the following can be considered.

A possible gap can be added to the timing advance (TA). Accordingly, the DL symbol is not affected. In the paired spectrum, the gap added to the TA may be considered. The gap added to the TA may be a fixed offset. The fixed offset may be determined based on the switching time from the UL to the DL and/or the maximum possible gap between the UL slot boundary and the DL slot boundary due to the mis-alignment. This fixed offset may also be required for the DL BWP having the extended CP and the UL BWP having the normal CP.

The gap can be absorbed by the CP of the DL BWP. Therefore, the UE may not receive some CPs in the first symbol of each slot.

The DL/UL slot structure can occur only within 0.5 ms (only one switching within 0.5 ms)

The DL/UL switching gap can absorb the TA. This may be necessary in the case of the DL BWP having the normal CP and the UL BWP having the extended CP.

Depending on which any BWP of the DL BWP or the UL BWP uses the extended CP, the DL/UL switching gap may absorb the offset or the UL/DL switching gap may absorb the offset. For example, in the case of the DL BWP having the normal CP and the UL BWP having the extended CP, the gap may be reflected in the DL/UL switching gap.

Figure 16:
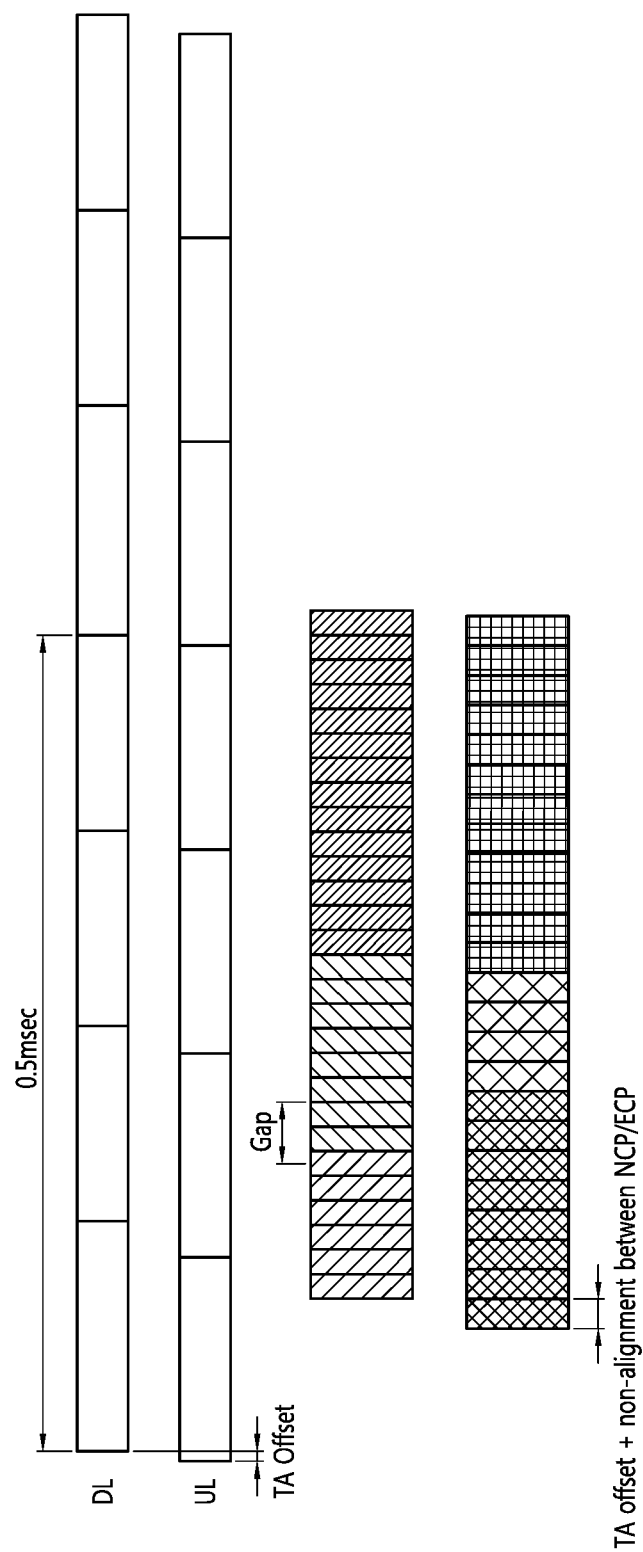
FIG. 16 shows an example of the gap that can be applied in the unpaired spectrum according to the embodiment of the present disclosure.

FIG. 16 shows an example of the gap that can be applied in the unpaired spectrum according to the embodiment of the present disclosure. The gap may be different depending on the combination of numerology/subcarrier spacing of each DL/UL. For example, if both the DL and the UL use a subcarrier spacing of 15 kHz, no gap is required. If both the DL and the UL use a subcarrier spacing of 30 kHz, the gap may be 0.51 μs. FIG. 16 illustrates a gap between the DL BWP having the normal CP and the UL BWP having the extended CP.

The pairing of the numerology between the DL and the UL may be indicated through a slot formation indication (SFI), and the SFI may be transmitted based on the DL or the UL or the DL/UL. In order to handle the DL and the UL having different CPs and having the same subcarrier spacing, the DL-UL switching slot may be applied. In the DL-UL switching slot, the DL symbol may be configured based on the CP of the DL, and the UL slot may be configured based on the CP of the UL. Nevertheless, if the DL and the UL have different numerologies, the paring of the numerology through the SFI needs to be indicated. Otherwise, it can be assumed that the DL and the UL use the same numerology. That is, the SFI includes the numerology for the DL/UL.

(3) USS Configuration

The set of PBRs for the USS, the UE bandwidth, etc., may be configured. In the USS configuration, the following options may be considered.

Option 1: Configuration through MSG4

RRC ambiguity can be handled through the option 1. In the option 1, there is no transmission until a hybrid automatic repeat request acknowledgement (HARQ-ACK) for the MSG4 is received. In addition, a validity timer for reconfiguration of the UE specific USS/CSS can be used. The USS configuration may trigger the validity timer to operate, and when the timer expires, the UE may determine that the USS configuration is valid. Before the USS configuration, the CSS for MSG4 can be used as the default USS/CSS. Alternatively, a media access control (MAC) control element (CE) may be used for the USS configuration. Alternatively, each USS configuration can be configured with an offset for effective timing.

Option 2: Use CSS for MSG4 to schedule RRC message

In the option 2, the network may transmit an RRC reconfiguration message or a UE specific message through the CSS and USS for MSG4 until the HARQ-ACK for MSG4 is received. The BWP used for a fallback message can be based on the potential maximum bandwidth. Alternatively, the BWP used for the fallback message can be based on a system maximum bandwidth. Alternatively, the BWP used for the fallback message can be based on the preconfigured or determined UE maximum bandwidth. Alternatively, the BWP used for the fallback message can be based on a minimum bandwidth. The minimum bandwidth may be configured with a fallback resource, and defined by the location of the SS/PBCH block, and/or defined in the SIB, and/or configured with the CORESET. The fallback message may be defined, for example, as the UE specific data scheduled in a search space other than the USS. The fallback message can be used whenever the RRC configuration is performed. If the network changes the frequency location of the UE bandwidth, the network may copy and transmit the fallback message until it is certain that the UE has been reconfigured.

(4) CSS Configuration

The set of PBRs for the CSS, the CSS data bandwidth (that is, CSS BWP), etc., can be configured. In the CSS configuration, the following options may be considered.

A separate BWP for the CSS may be at least configured for a transmit power command (TPC) and a fallback operation. The CSS may be configured together with the USS. One CSS based on the minimum bandwidth may be configured according to bandwidth adaptation. Alternatively, a plurality of CSSs may be configured, and at least one CSS may be configured based on the minimum bandwidth. The BWP used for the fallback message can be based on the potential maximum bandwidth. Alternatively, the BWP used for the fallback message can be based on the system maximum bandwidth. Alternatively, the BWP used for the fallback message can be based on the pre-configured or determined UE maximum bandwidth. Alternatively, the BWP used for the fallback message can be based on the minimum bandwidth. The minimum bandwidth may be configured as the fallback resource, and defined by the location of the SS/PBCH block, and/or defined in the SIB, and/or configured with the CORESET.

This CSS should be readable from the UE BWP. In configuring the CSS for each configured BWP, the following may be considered.

Option 1: The CSS in the configured BWP addresses the entire BWP.

Option 2: The CSS in the configured BWP addresses only the UE minimum bandwidth.

Option 3: The CSS in the configured BWP addresses only the configured bandwidth. That is, separate configurations may be provided to enable CSS sharing between different UEs having different BWP configurations.

Option 4: The CSS in the configured BWP may follow any of the above-described options 1 to 3 depending on which DCI is scheduled and/or which RNTI is used for scheduling. For example, if the cell RNTI (C-RNTI) is used, it may follow the option 1 described above, and if the system information RNTI (SI-RNTI) is used, it may follow the option 2 described above. Different RNTIs may mean that the bandwidths to be covered are different, and the fallback DCI may use the same bandwidth as that of the UE minimum BWP or that of the default BWP.

(5) SI Update Processing

When the UE returns to the frequency domain where full or partial access to the initial CSS may not be allowed and the UE receives an indication related to the SI update, the following options may be considered.

The network can transmit a separate SIB in the corresponding frequency domain. The UE can monitor the SIB transmitted separately using the group common search area. The group common search area can be shared with the CSS.

The UE may omit monitoring of the initial CSS frequency domain that may require a gap. The gap may be explicitly configured by the network or may be determined implicitly (for example, during discontinuous reception (DRX)).

SI can be updated UE-specifically only.

The network may reconfigure the SS/PBCH block within the BWP of the UE including the RMSI. This is a similar operation to a handover in a cell. For this, the PRACH resource selection can be used. Specifically, the PRACH resource may indicate a new SS/PBCH block for the UE that has selected the PRACH resource. The PRACH resource may include load information so that the UE can select the PRAHC resource having a low load. Alternatively, the PRACH resource may be implicitly selected based on the UE ID. Alternatively, the PRACH resource selection scheme may be indicated by the network through the RMSI (similar to narrowband internet-of-things (NB-IoT)). Also, a similar mechanism can be applied to paging. The frequency at which the paging is transmitted may be determined based on the UE ID. For the paging for the UE in the idle state, it may be desirable to indicate the associated SS/PBCH block.

(6) Configuration of Multiple Carriers within a Wideband Carrier

When the UE includes a plurality of radio frequencies (RF), if the UE is associated with the wideband carrier, the UE may inform the network of the information on the plurality of RFs, and the network may configure the multiple carriers. If additional carriers are configured, the initial access procedure may or may not be omitted depending on the network configuration. Regardless of whether or not the initial access procedure is omitted, the location of the SS/PBCH block for the potential serving cell and/or neighbor cell may be indicated to the UE for additional RF. If necessary, the network may transmit a PDCCH order to acquire the uplink synchronization on an additionally configured carrier. This is particularly important when different transmission/reception points (TRPs) operate within the bandwidth configured for control/data reception, or when the UE uses different RFs for transmission.

If the UE acquires PSS/SSS/PBCH/SIB, etc., for additional RF (for example, the second RF), a similar procedure performed in the first RF may be performed even in the additional RF. At this time, there is little effect on the first RF. However, two RFs may be connected to each other, and accordingly, retuning in one RF may require service interruption in the other RF. In this case, the frequency retuning delay in one RF needs to be considered in the other RF. Therefore, whenever the UE needs to retune the frequency in one RF, it should be assumed that it affects the other RF.

Whether the service should be stopped on all RFs can be indicated by the UE. That is, similar to signaling indicating whether the measurement gap is required, the UE can indicate whether the service interruption is applied to all RFs in the NR carrier. The indication may be indicated for each band and/or for each combination of bands and/or for each UE. This may be particularly important when dual connectivity (DC) between the LTE and the NR or the DC between the NR carriers is used. To support this, it is necessary to configure a set of subframes/slots and/or time resources or a set of time resources in which the frequency retuning can occur (in particular, when the retuning delay is large (for example, several μs or tens of μs or more)). In particular, when the bandwidth adaptation is used with a change in the center frequency, the delay or the service interruption may be required in the plurality of RFs used for the DC. Accordingly, the bandwidth adaptation needs to be performed only on a single connection (at least between RFs that affect each other), or the service interruption needs to be considered for control/data transmission.

Alternatively, the service interruption may be processed based on wireless communication between TRPs. More specifically, if the UE has independent oscillators or different RFs in different chips and does not affect each other between the DC carriers, the UE may inform the network of the capability for bandwidth adaptation (and/or the capability for supporting a plurality of BWPs) for each band and/or each combination of bands and/or each UE. The capability for bandwidth adaptation (and/or the capability for supporting a plurality of BWPs) indicates whether the UE can perform the bandwidth adaptation on one carrier or multiple carriers without affecting other carriers. Alternatively, the capability for bandwidth adaptation (and/or the capability for supporting a plurality of BWPs) can indicate bands and/or combinations of bands that the bandwidth adaptation can affect so that the network can properly schedule the service interruption. If the network is not sure whether the UE requests the service interruption on all carriers, or in the case of the carrier for the DC, all service interruptions can be transmitted from PCell to align the service interruption. Therefore, both the master cell group (MCG) and the secondary cell group (SCG) can handle the service interruption.

(7) Sharing CSS Between UEs in Different Frequency Domains with Different Bandwidth Capabilities Option 1: Separate CSS for different frequency domains Option 2: Shared CSS for different frequency domains When the multiplexing is performed by a time division multiplexing (TDM) scheme to access the shared CSS or when an explicit configuration for timing is indicated, the UE may retune the initial CSS when it is different from the frequency of the USS.

(8) In each CSS and/or USS configuration for control channel monitoring, a monitoring period may be additionally configured. That is, for each CORESET and/or SS/PBCH block, the monitoring period may be configured separately. Additionally, if the default value is not used, a set of set levels and/or the number of candidates may be configured.

Figure 17:
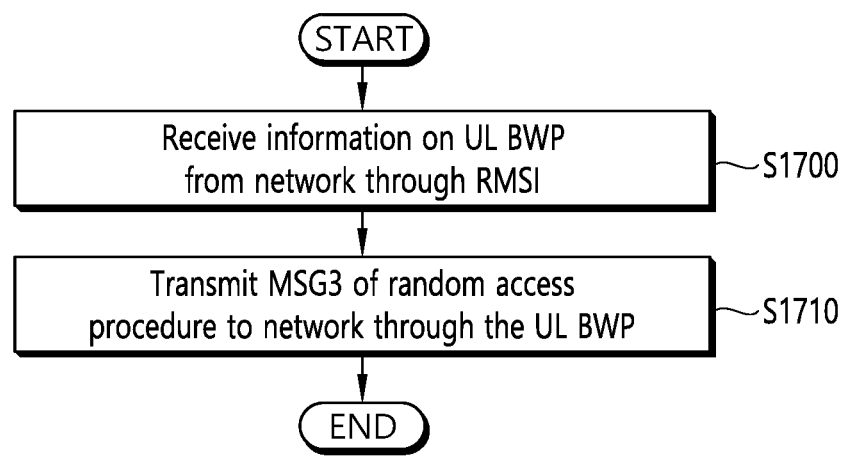
FIG. 17 shows a method for operating a UE according to an embodiment of the present disclosure.

FIG. 17 shows a method for operating a UE according to an embodiment of the present disclosure. The present disclosure described above on the UE side can be applied to the present embodiment.

In step S1710, the UE receives the information on the UL BWP from the network through the RMSI.

The UL BWP may be configured separately from the DL BWP. The information on the UL BWP may include the information on the frequency where the UL BWP is located. The information on the frequency of the UL BWP may include information on an offset from a specific UL frequency. The specific UL frequency may be a subcarrier having index 0 of a given numerology. The bandwidth of the UL BWP may be the same as the UE minimum bandwidth. The information on the UL BWP may further include the information on the frequency of the UL BWP.

In step S1710, the UE transmits the MSG3 of the random access procedure to the network through the UL BWP.

According to an embodiment of the present disclosure described in FIG. 17, the information on the UL BWP for transmission of the MSG3 may be configured separately from PRACH. In addition, the corresponding UL BWP may be configured separately from the DL DWP. Therefore, the UL BWP for transmission of the MSG3 may be supported.

Figure 18:
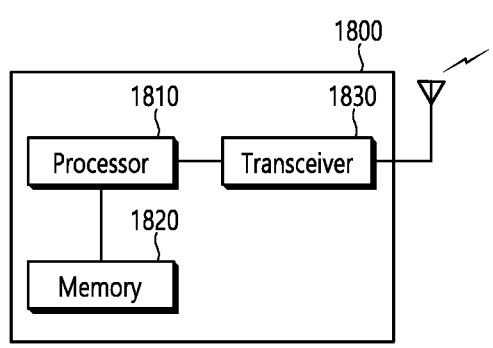
FIG. 18 shows a UE to which the embodiment of the present disclosure is implemented.

FIG. 18 shows a UE to which the embodiment of the present disclosure is implemented. The present disclosure described above on the UE side can be applied to the present embodiment.

A UE 1800 includes a processor 1810, a memory 1820, and a transceiver 1830. The processor 1810 can be configured to implement functions, processes, and/or methods described herein. Layers of the radio interface protocol may be implemented in the processor 1810. More specifically, the processor 1810 controls the transceiver 1830 to receive the information on the UL BWP from the network through the RMSI, and controls the transceiver 1830 to transmit the MSG3 of the random access procedure to the network through the UL BWP.

The UL BWP may be configured separately from the DL BWP. The information on the UL BWP may include the information on the frequency where the UL BWP is located. The information on the frequency of the UL BWP may include information on an offset from the specific UL frequency. The specific UL frequency may be a subcarrier having index 0 of a given numerology. The bandwidth of the UL BWP may be the same as the UE minimum bandwidth. The information on the UL BWP may further include the information on the frequency of the UL BWP.

The memory 1820 is connected to the processor 1810 and stores various information for driving the processor 1810. The transceiver 1830 is connected to the processor 1810 and transmits and/or receives a radio signal.

The processor 1810 may include an application-specific integrated circuit (ASIC), other chipsets, logic circuits, and/or data processing devices. The memory 1820 may include a read-only memory (ROM), a random access memory (RAM), a flash memory, a memory card, a storage medium, and/or other storage devices. The transceiver 1830 may include a baseband circuit for processing radio frequency signals. When the embodiment is implemented in software, the above-described technique may be implemented as a module (process, function, etc.) performing the above-described function. The module may be stored in the memory 1820 and can be executed by the processor 1810. The memory 1820 may be inside or outside the processor 1810 and may be connected to the processor 1810 by various well-known means.

According to an embodiment of the present disclosure described in FIG. 18, the information on the UL BWP for transmission of the MSG3 may be configured separately from the PRACH. In addition, the corresponding UL BWP may be configured separately from the DL DWP. Therefore, the UL BWP for transmission of the MSG3 may be supported.

Figure 19:
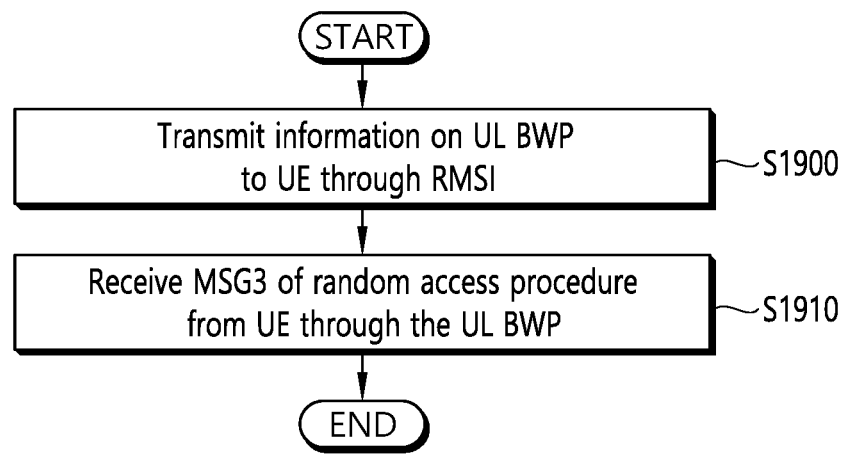
FIG. 19 shows a method for operating a BS according to an embodiment of the present disclosure.

FIG. 19 shows a method for operating a BS according to an embodiment of the present disclosure. The present disclosure described above on the BS side can be applied to the present embodiment.

In step S1910, the BS transmits the information on the UL BWP to the UE through the RMSI.

The UL BWP may be configured separately from the DL BWP. The information on the UL BWP may include the information on the frequency where the UL BWP is located. The information on the frequency of the UL BWP may include information on an offset from the specific UL frequency. The specific UL frequency may be a subcarrier having index 0 of a given numerology. The bandwidth of the UL BWP may be the same as the UE minimum bandwidth. The information on the UL BWP may further include the information on the bandwidth of the UL BWP.

In step S1910, the BS receives the MSG3 of the random access procedure from the UE through the UL BWP.

According to the embodiment of the present disclosure described in FIG. 19, the information on the UL BWP for transmission of the MSG3 may be configured separately from the PRACH. In addition, the corresponding UL BWP may be configured separately from the DL DWP. Therefore, the UL BWP for transmission of the MSG3 may be supported.

Figure 20:
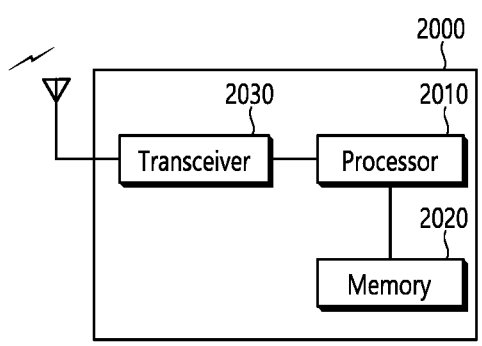
FIG. 20 shows a BS to which the embodiment of the present disclosure is implemented.

FIG. 20 shows a BS to which the embodiment of the present disclosure is implemented. The present disclosure described above on the BS side can be applied to the present embodiment.

A BS 2000 includes a processor 2010, a memory 2020, and a transceiver 2030. The processor 2010 can be configured to implement functions, processes, and/or methods described herein. Layers of the radio interface protocol may be implemented in the processor 2010. More specifically, the processor 2010 controls the transceiver 2030 to transmit the information on the UL BWP to the UE through the RMSI, and controls the transceiver 2030 to receive the MSG3 of the random access procedure from the UE through the UL BWP.

The UL BWP may be configured separately from the DL BWP. The information on the UL BWP may include the information on the frequency where the UL BWP is located. The information on the frequency of the UL BWP may include information on an offset from the specific UL frequency. The specific UL frequency may be a subcarrier having index 0 of a given numerology. The bandwidth of the UL BWP may be the same as the UE minimum bandwidth. The information on the UL BWP may further include the information on the bandwidth of the UL BWP.

The memory 2020 is connected to the processor 2010 and stores various information for driving the processor 2010. The transceiver 2030 is connected to the processor 2010 and transmits and/or receives a radio signal.

The processor 2010 may include an ASIC, other chipsets, logic circuits, and/or data processing devices. The memory 2020 may include a ROM, a RAM, a flash memory, a memory card, a storage medium, and/or other storage devices. The transceiver 2030 may include a baseband circuit for processing radio frequency signals. When the embodiment is implemented in software, the above-described technique may be implemented as a module (process, function, etc.) performing the above-described function. The module may be stored in the memory 2020 and can be executed by the processor 2010. The memory 2020 may be inside or outside the processor 2010 and may be connected to the processor 2010 by various well-known means.

According to the embodiment of the present disclosure described in FIG. 20, the information on the UL BWP for transmission of the MSG3 may be configured separately from the PRACH. In addition, the corresponding UL BWP may be configured separately from the DL DWP. Therefore, the UL BWP for transmission of the MSG3 may be supported.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, comprising:
   receiving, from a network, information for a numerology;
   receiving, from the network, information for an offset between a frequency location of an uplink (UL) bandwidth part (BWP) and a subcarrier 0 of a specific resource block having an index 0;
   identifying the frequency location of the UL BWP based on the numerology and the offset; and
   transmitting, to the network, a message 3 (MSG3) of a random access procedure through the UL BWP on the frequency location,
   wherein the frequency location of the UL BWP for the transmitting of the MSG3 is different from a frequency location of a UL BWP for a transmission of a random access preamble.

2. The method of claim 1, wherein the UL BWP for the transmitting of the MSG3 is configured separately from a downlink (DL) BWP.

3. A user equipment (UE) in a wireless communication system, comprising:
   a memory;
   a transceiver; and
   a processor connected to the memory and the transceiver, and configured to:
   control the transceiver to receive, from a network, information for a numerology;
   control the transceiver to receive, from the network, information for an offset between a frequency location of an uplink (UL) bandwidth part (BWP) and a subcarrier 0 of a specific resource block having an index 0;
   identify the frequency location of the UL BWP based on the numerology and the offset; and
   control the transceiver to transmit, to the network, a message 3 (MSG3) of a random access procedure through the UL BWP on the frequency location,
   wherein the frequency location of the UL BWP for the transmitting of the MSG3 is different from a frequency location of a UL BWP for a transmission of a random access preamble.

4. A method for operating a base station in a wireless communication system, comprising:
   transmitting, to a wireless device, information for a numerology;
   transmitting, to the wireless device, information for an offset between a frequency location of an uplink (UL) bandwidth part (BWP) and a subcarrier 0 of a specific resource block having an index 0; and
   receiving, from the wireless device, a message 3 (MSG3) of a random access procedure through the UL BWP on the frequency location,
   wherein the frequency location of the UL BWP for the transmitting of the MSG3 is different from a frequency location of a UL BWP for a transmission of a random access preamble.

5. The method of claim 4, wherein the UL BWP for the transmitting of the MSG3 is configured separately from a downlink (DL) BWP.

6. The method of claim 1, wherein the wireless device is in communication with at least one of a mobile device, a network, or autonomous vehicles other than the wireless device.

* * * * *